(12) United States Patent
Murata et al.

(10) Patent No.: US 11,567,380 B2
(45) Date of Patent: Jan. 31, 2023

(54) LIQUID CRYSTAL DISPLAY DEVICE

(71) Applicant: Sharp Kabushiki Kaisha, Sakai (JP)

(72) Inventors: Koji Murata, Sakai (JP); Hidefumi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/536,330

(22) Filed: Nov. 29, 2021

(65) Prior Publication Data

US 2022/0171226 A1    Jun. 2, 2022

(30) Foreign Application Priority Data

Nov. 30, 2020 (JP) .............................. JP2020-198826

(51) Int. Cl.
  *G02F 1/1343*  (2006.01)
  *G02F 1/1368*  (2006.01)
(52) U.S. Cl.
  CPC ...... *G02F 1/1368* (2013.01); *G02F 1/134372* (2021.01)
(58) Field of Classification Search
  CPC ......... G02F 1/134381; G02F 1/134372; G02F 1/1368; G02F 1/1323
  See application file for complete search history.

(56) References Cited

U.S. PATENT DOCUMENTS

| | | |
|---|---|---|
| 2007/0040780 A1 | 2/2007 | Gass et al. |
| 2007/0146606 A1 | 6/2007 | Yamashita |
| 2011/0012924 A1 | 1/2011 | Gass et al. |
| 2012/0056914 A1 | 3/2012 | Gass et al. |
| 2012/0147026 A1 | 6/2012 | Gass et al. |
| 2017/0255048 A1* | 9/2017 | Ogawa ............... C09K 19/3402 |
| 2021/0223584 A1* | 7/2021 | Fan ................... G02F 1/134309 |

FOREIGN PATENT DOCUMENTS

| | | |
|---|---|---|
| JP | 2007-178907 A | 7/2007 |
| JP | 2011-253206 A | 12/2011 |

* cited by examiner

*Primary Examiner* — James A Dudek
(74) *Attorney, Agent, or Firm* — Keating & Bennett, LLP

(57) ABSTRACT

Provided is a liquid crystal display device including: an active matrix substrate including a first substrate, and a first electrode and a second electrode that are stacked via a first insulating layer or that face each other on the first substrate, the second electrode being disposed for each sub-pixel; and a counter substrate sequentially including a second substrate, a third electrode including linear electrode portions, a second insulating layer, and a fourth electrode including linear electrode portions, an extending direction of the linear electrode portions of the third electrode intersecting an extending direction of the linear electrode portions of the fourth electrode in a plan view; and a control circuit being configured to switch between application of an alternating voltage and application of a constant voltage to the third electrode and/or the fourth electrode.

4 Claims, 28 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2020-198826 filed on Nov. 30, 2020, the contents of which are incorporated herein by reference in their entirety.

BACKGROUND OF THE INVENTION

Field of the Invention

The present invention relates to a liquid crystal display device.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. Meanwhile, a display method considered in terms of privacy protection is one that allows observation of an image in a narrow viewing angle range but makes the image difficult to observe in a wide viewing angle range. For example, JP 2007-178907 A discloses a liquid crystal display device having an FFS structure that generates a horizontal electric field between a first electrode and a second electrode disposed on a first substrate, the liquid crystal display device further including on a second substrate facing the first substrate a third electrode for generating a vertical electric field with the first electrode and the second electrode. JP 2007-178907 A studies controlling the viewing angle by controlling the vertical electric field.

In addition, JP 2011-253206 A discloses a liquid crystal display device including a liquid crystal display panel, first and second sets of regions in the liquid crystal display panel, and circuitry being adapted to apply an electric field in first and second different ways in the first and second sets of regions respectively, wherein a display can be switched between a public mode and a private mode, and a masking image is displayed in the private mode. Herein, this technique is referred to as a veil-view technique (function).

BRIEF SUMMARY OF THE INVENTION

The liquid crystal display device disclosed in JP 2007-178907 A has difficulty for achieving sufficient transmittance and contrast ratio. It is also difficult to ensure sufficient privacy in observation from oblique directions. The liquid crystal display device disclosed in JP 2011-253206 A cannot ensure sufficient privacy in terms of observation from the up-down directions and left-right directions of its display screen, although making an image difficult to observe from a direction oblique to its display screen.

In response to the above issues, an object of the present invention is to provide a liquid crystal display device that can switch display modes having different viewing angles by adjusting the voltages applied to two types of electrodes on the counter substrate side, and can ensure the privacy in observation from oblique directions of the liquid crystal panel by incorporating the veil-view function.

(1) One embodiment of the present invention is directed to a liquid crystal display device including: a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules, a second alignment film, and a counter substrate, the active matrix substrate including a first substrate, and a first electrode and a second electrode that are stacked via a first insulating layer or that face each other on the first substrate, the second electrode being disposed for each of the sub-pixels, the counter substrate sequentially including a second substrate, a third electrode including linear electrode portions, a second insulating layer, and a fourth electrode including linear electrode portions, an extending direction of the linear electrode portions of the third electrode intersecting an extending direction of the linear electrode portions of the fourth electrode in a plan view, the control circuit being configured to switch between application of an alternating voltage and application of a constant voltage to the third electrode and/or the fourth electrode.

(2) In an embodiment of the present invention, the liquid crystal display device includes the structure (1), the control circuit is configured to switch between a first display mode that allows a first image to be observable in a narrow viewing angle range including a normal direction of the liquid crystal panel and a second display mode that allows the first image to be observable in a wide viewing angle range including the narrow viewing angle range, in the first display mode, the control circuit applies to one of the third electrode and the fourth electrode a constant voltage common to the first electrode or the second electrode or an alternating voltage higher than the constant voltage and applies to the other of the third electrode and the fourth electrode an alternating voltage higher than the voltage applied to the one of the third electrode and the fourth electrode, and in the second display mode, the control circuit applies to the third electrode and the fourth electrode a constant voltage common to the first electrode or the second electrode.

(3) In an embodiment of the present invention, the liquid crystal display device includes the structure (2), at least one of the first electrode or the second electrode includes linear electrode portions extending in a first direction, the extending direction of the linear electrode portions of the third electrode forms an angle of 0° or greater and 30° or smaller with the first direction, the extending direction of the linear electrode portions of the fourth electrode forms an angle of 60° or greater and 90° or smaller with the first direction, and in the first display mode, the control circuit switches between a first viewing angle limiting mode in which an alternating voltage higher than the voltage applied to the third electrode is applied to the fourth electrode and a second viewing angle limiting mode in which an alternating voltage higher than the voltage applied to the fourth electrode is applied to the third electrode.

(4) In an embodiment of the present invention, the liquid crystal display device includes the structure (2) or (3), the liquid crystal panel includes display units that utilize a veil-view function to display an image, the display units each include a pair of sub-pixels arranged adjacent to each other, one of the sub-pixels being a first sub-pixel selected from odd-number rows and the other being a second sub-pixel selected from even-number rows, and the control circuit is configured to input different image signals to the respective sub-pixels so as to allow a second image, different from the first image, to be observable in the wide viewing angle range.

(5) In an embodiment of the present invention, the liquid crystal display device includes any one of the structures (1) to (4), and the counter substrate includes a dielectric layer between the fourth electrode and the second alignment film.

The present invention can provide a liquid crystal display device that can switch display modes having different viewing angles by adjusting the voltages applied to two types of electrodes on the counter substrate side and incorporating the veil-view function.

DETAILED DESCRIPTION OF THE INVENTION

Hereinafter, an embodiment of the present invention is described. The present invention is not limited to the following embodiment, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

The liquid crystal display device according to the embodiment of the present invention includes: a liquid crystal panel; and a control circuit, the liquid crystal panel including sub-pixels arranged in a matrix pattern in an in-plane direction and sequentially including an active matrix substrate, a first alignment film, a liquid crystal layer containing liquid crystal molecules, a second alignment film, and a counter substrate, the active matrix substrate including a first substrate, and a first electrode and a second electrode disposed for each sub-pixel, which are stacked via a first insulating layer or which face each other on the first substrate, the counter substrate sequentially including a second substrate, a third electrode including linear electrode portions, a second insulating layer, and a fourth electrode including linear electrode portions, an extending direction of the linear electrode portions of the third electrode intersecting an extending direction of the linear electrode portions of the fourth electrode in a plan view, the control circuit being configured to switch between application of an alternating voltage and application of a constant voltage to the third electrode and/or the fourth electrode.

Figure 1:
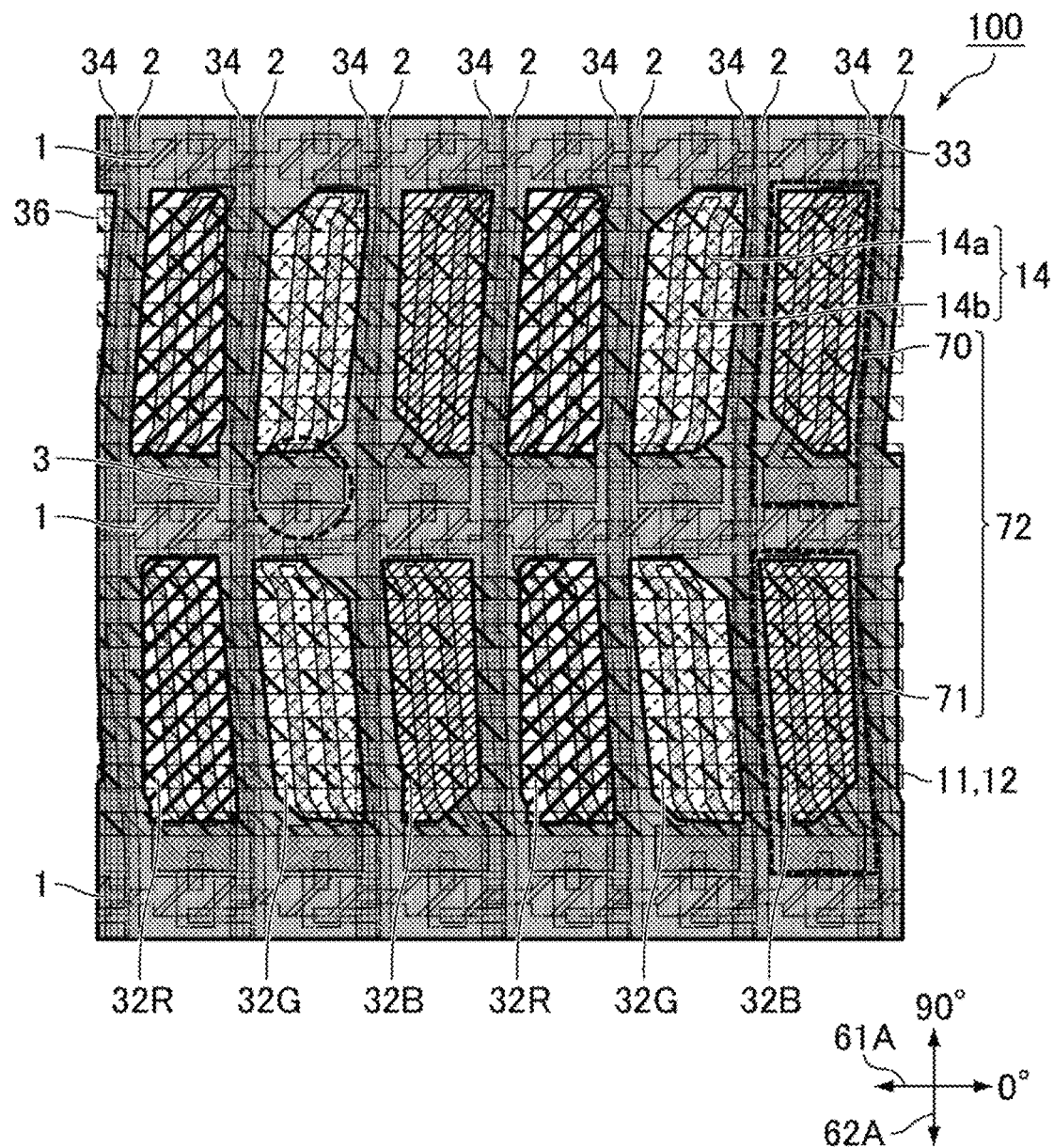
FIG. 1 is a schematic plan view of an exemplary liquid crystal display device according to an embodiment.
Figure 2:
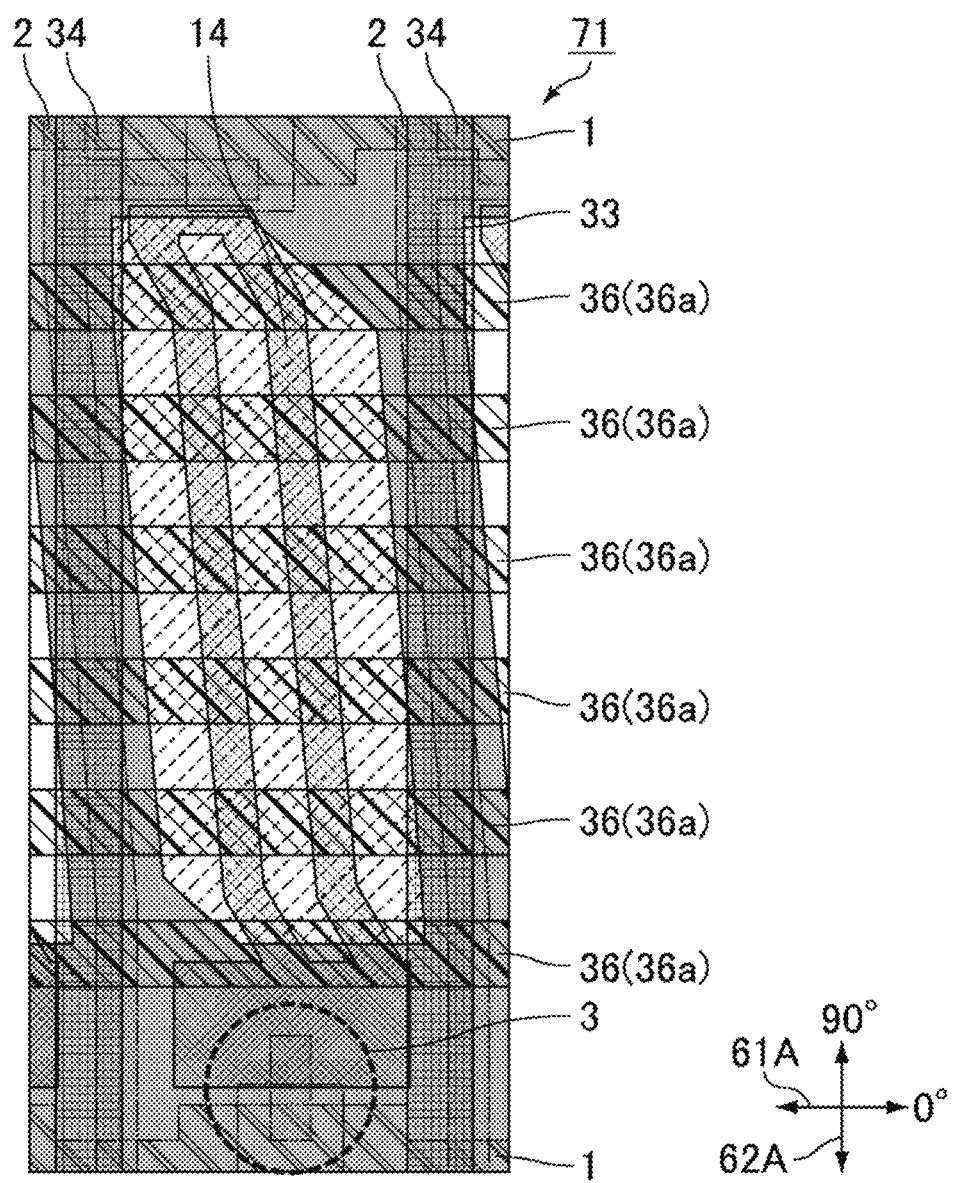
FIG. 2 is a schematic plan view of one sub-pixel of the liquid crystal display device shown in FIG. 1.

The liquid crystal display device according to the embodiment is described below with reference to the drawings. FIG. 1 is a schematic plan view of an exemplary liquid crystal display device according to the embodiment. FIG. 2 is a schematic plan view of one sub-pixel of the liquid crystal display device shown in FIG. 1. The "sub-pixel" as used herein refers to a region surrounded by two adjacent gate lines 1 and two adjacent source lines 2 on an active matrix substrate 10 as shown in FIG. 1 described later.

As shown in FIG. 1, a liquid crystal panel 100 includes sub-pixels arranged in a matrix pattern in the in-plane direction. The sub-pixels include the later-described first sub-pixel 70 and second sub-pixel 71 and are simply referred to as "sub-pixels" when no particular distinguishment is needed between the first sub-pixel 70 and the second sub-pixel 71. Each sub-pixel is provided with an optical opening that allows light to pass through the liquid crystal panel 100. In the case where the liquid crystal panel 100 is a transmissive one, the optical opening is a region that allows light emitted from the back surface of the liquid crystal panel 100 to travel toward the front surface of the liquid crystal panel 100. In the case where the liquid crystal panel 100 is a reflective one, the optical opening is a region that allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening may be superimposed with, for example, a transparent component such as a polarizer or a color filter in a plan view.

As shown in FIG. 1 and FIG. 2, the active matrix substrate 10 includes on the first substrate 11 parallel gate lines 1 and parallel source lines 2 intersecting the gate lines 1 via an insulating film. The gate lines 1 and the source lines 2 are arranged in a grid pattern as a whole. At each intersection of the gate lines 1 and the source lines 2 is disposed a thin film transistor (TFT) 3 as a switching element. Examples of the material for the gate lines 1 and the source lines 2 include metal materials such as aluminum, copper, titanium, molybdenum, chromium, and an alloy of any of these.

Figure 5A:
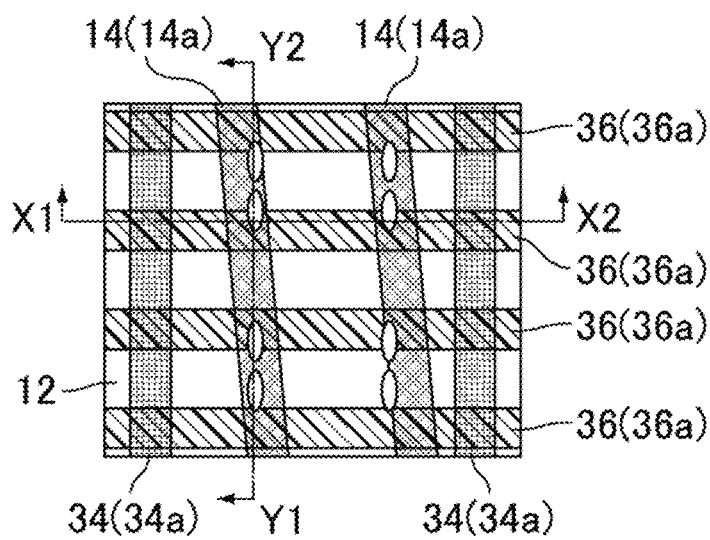
FIG. 5A is an enlarged schematic plan view of a part of FIG. 2 in black display in the wide viewing angle mode.
Figure 5B:
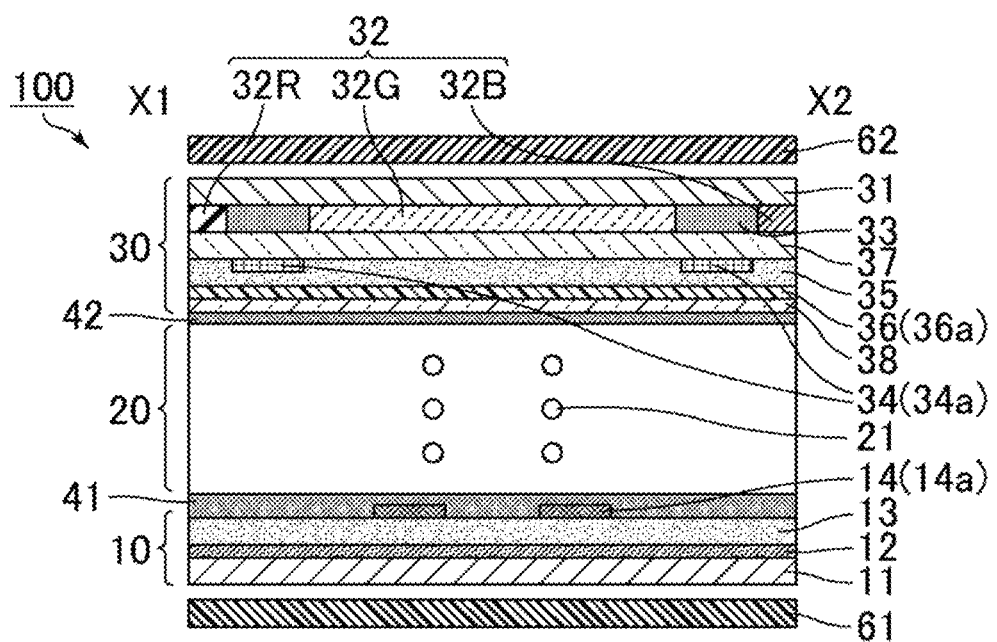
FIG. 5B is a schematic cross-sectional view taken along the line X1-X2 in FIG. 5A.

FIG. 5B is a schematic cross-sectional view taken along the line X1-X2 in FIG. 5A that is an enlarged schematic plan view of a part of FIG. 2. As shown in FIG. 5B, the liquid crystal panel 100 sequentially includes the active matrix substrate 10, a first alignment film 41, a liquid crystal layer 20 containing liquid crystal molecules 21, a second alignment film 42, and a counter substrate 30. Herein, the side closer to the screen (display screen) of the liquid crystal display device is also referred to as the "viewer side (front surface side)", and the side farther from the screen (display screen) of the liquid crystal display device is also referred to as the "back surface side". The liquid crystal panel 100 may include on the back surface side (on the side remote from the liquid crystal layer 20 of the active matrix substrate 10) a first polarizer 61 and on the front surface side (on the side remote from the liquid crystal layer 20 of the counter substrate 30) a second polarizer 62. The first polarizer 61 and the second polarizer 62 are preferably linearly polarizers. An absorption axis 61A of the first polarizer 61 and an absorption axis 62A of the second polarizer 62 are preferably arranged in the crossed Nicols such that they are perpendicular to each other. At least one of the absorption axis 61A or the absorption axis 62A may be parallel to the longitudinal direction of the sub-pixels.

The active matrix substrate includes a first substrate, and a first electrode and a second electrode disposed for each sub-pixel, which are stacked via a first insulating layer or which face each other on the first substrate. Hereinafter, the embodiment describes the case of employing a fringe field switching (FFS) electrode structure in which the active matrix substrate 10 includes the first substrate 11, and a first electrode 12 and second electrodes 14 stacked via a first insulating layer 13 as shown in FIG. 5B. Alternatively, an in-plane switching (IPS) electrode structure may be employed in which the active matrix substrate includes a first substrate, and a first electrode and second electrodes that face each other on the first substrate.

The first electrode 12 is preferably a solid electrode. The first electrode 12 may be disposed for each sub-pixel, may be disposed for each group of multiple sub-pixels, or may be disposed in the entire display region regardless of the boundaries of sub-pixels. The solid electrode means an electrode without slits or openings at least in a region superimposed with the optical openings of the sub-pixels in a plan view. Examples of the material for the first electrode 12 include transparent conductive materials such as indium tin oxide (ITO) and indium zinc oxide (IZO).

Figure 3:
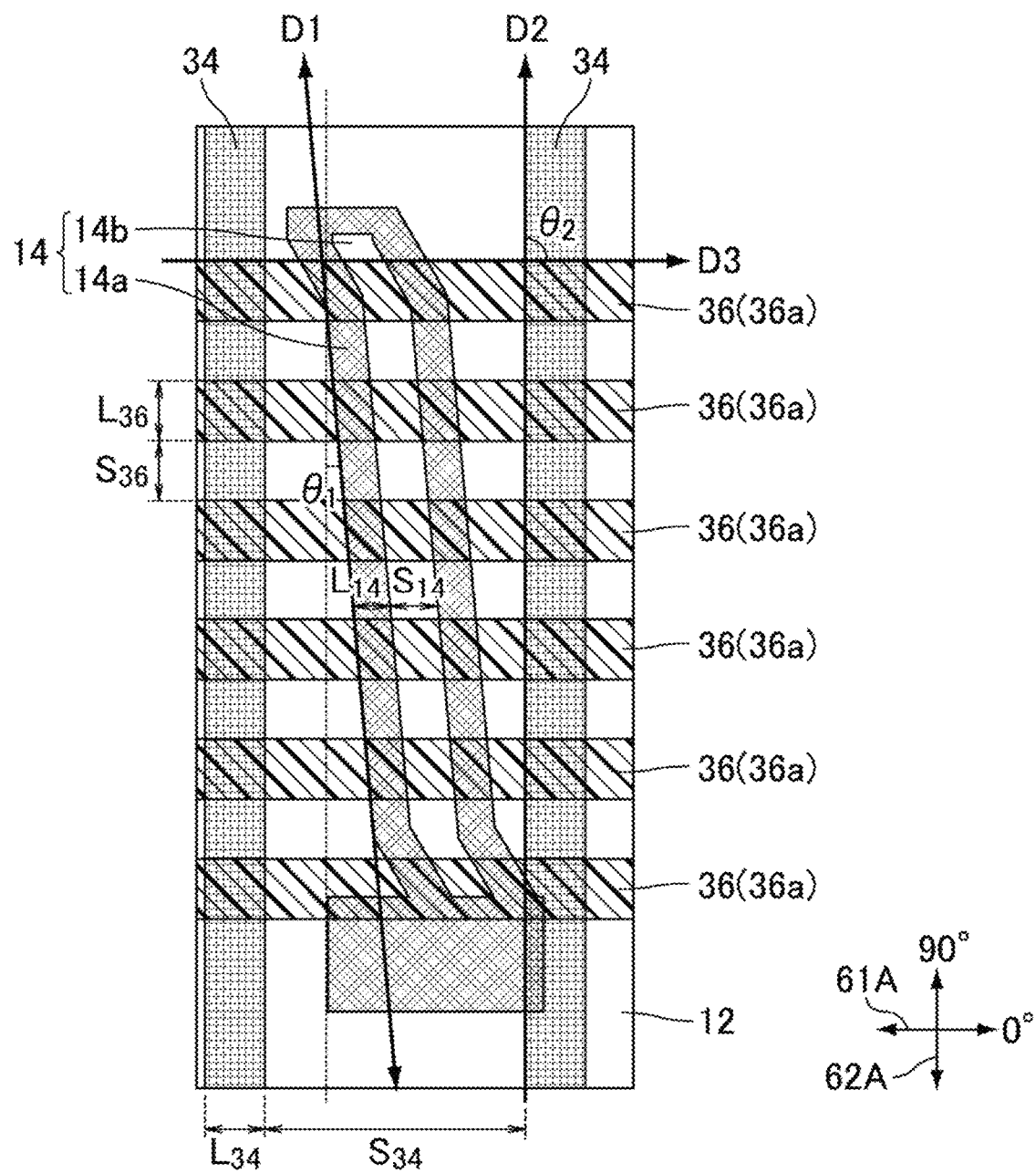
FIG. 3 is a schematic plan view illustrating arrangement of a first electrode, a second electrode, a third electrode, and a fourth electrode in FIG. 2.

FIG. 3 is a schematic plan view illustrating arrangement of a first electrode, a second electrode, a third electrode, and a fourth electrode in FIG. 2. As shown in FIG. 3, at least one of the first electrode 12 or the second electrode 14 preferably includes linear electrode portions extending in a first direction D1. The embodiment describes the case where the second electrode 14 is disposed for each sub-pixel and includes linear electrode portions extending in the first direction. Each second electrode 14 has a planar shape in which the linear electrode portions 14a are closed at both ends as shown in FIG. 2 and FIG. 3, for example. Each second electrode 14 may be provided with an opening 14b surrounded by electrode portions. The first direction D1 may form an angle θ1 of 0° to 15°, more preferably 0° to 5°, with the absorption axis 61A of the first polarizer 61 or the absorption axis 62A of the second polarizer 62. FIG. 3 shows an example of the case in which the absorption axis 62A is parallel to the longitudinal direction of the sub-pixel 71. As shown in FIG. 3, each linear electrode portion 14a may include at least a portion extending in the first direction D1 and may include a portion extending in a different direction from the first direction D1. Examples of the material for the second electrodes 14 include transparent conductive materials such as ITO and IZO. The electrode width $L_{14}$ of one linear electrode portion 14a may be 2 µm or greater and 5 µm or smaller, and the distance (width of the opening) $S_{14}$ between two adjacent linear electrode portions 14a may be 2 µm or greater and 5 µm or smaller.

For example, the second electrodes 14 disposed for the respective sub-pixels may be electrically connected to each other and may apply a common constant voltage to the sub-pixels, and the first electrodes 12 disposed for the respective sub-pixels may each be electrically connected to the corresponding source line 2 via the semiconductor layer of the corresponding TFT 3 and may apply different magnitudes of voltage to the sub-pixels in response to image signals. Alternatively, the second electrodes 14 disposed for the respective sub-pixels may each be electrically connected to the corresponding source line 2 via the semiconductor layer of the corresponding TFT 3 and may apply different magnitudes of voltage to the sub-pixels in response to image signals, and the first electrode 12 may be formed on the entire display region regardless of the boundaries of the sub-pixels, or multiple first electrodes 12 electrically connected to each other may be disposed for the respective sub-pixels and may apply a common constant voltage to the sub-pixels.

The liquid crystal layer 20 preferably contains liquid crystal molecules 21 having a positive anisotropy of dielectric constant. In other words, the liquid crystal molecules 21 preferably have a positive value for the anisotropy of dielectric constant (Δε) defined by the following formula. The liquid crystal molecules 21 are preferably homogeneously aligned in a no-voltage-applied state (with no voltage applied). The direction of the major axes of the liquid crystal molecules 21 with no voltage applied is also referred to as the initial alignment of the liquid crystal molecules. The term "with no voltage applied" includes a state with a voltage lower than the threshold value of the liquid crystal molecules applied.

$$\Delta\varepsilon = \text{(dielectric constant of liquid crystal molecules in major axis direction)} - \text{(dielectric constant of liquid crystal molecules in minor axis direction)}$$

The expression "with no voltage applied" means the state in which a voltage equal to or higher than the threshold value of the liquid crystal molecules is not applied to the liquid crystal layer 20. Examples thereof include the state in which the same constant voltage is applied to all of the first electrode, the second electrodes, the third electrode, and the fourth electrode; the state in which a constant voltage is applied to at least one of the first electrode, the second electrodes, the third electrode, or the fourth electrode and a voltage lower than the threshold value of the liquid crystal molecules is applied to the other electrode(s), relative to the constant voltage.

Examples of the first substrate 11 and the later-described second substrate 31 include, but are not limited to, substrates made of a resin such as polycarbonate and glass substrates. Examples of the material for the first insulating layer 13 and the later-described second insulating layer 35 include inorganic materials such as silicon oxide and silicon nitride.

As shown in FIG. 5B, the counter substrate 30 sequentially includes the second substrate 31, color filters 32, a third electrode 34 including linear electrode portions 34a, the second insulating layer 35, and a fourth electrode 36 including linear electrode portions 36a.

In a front view of the liquid crystal panel 100, the color filters 32 may be disposed for the respective sub-pixels so as to be superimposed with the optical openings as shown in FIG. 1. The color filters 32 include red color filters 32R, green color filters 32G, and blue color filters 32B, for example. The color filters 32 of the same color may be repeatedly arranged in the row or column direction of the liquid crystal panel 100, for example. Even in such a case, the boundaries of the sub-pixels are shielded from light by a black matrix 33, and thus the color filters 32 seem to be disposed for the respective sub-pixels and to be superimposed with the optical openings in a front view of the liquid crystal panel 100.

As shown in FIG. 1, the counter substrate 30 may include the black matrix 33. The black matrix 33 is not limited and may be a typical product used in the field of liquid crystal display devices. For example, a black matrix made of a black resin may be used. In a plan view, the black matrix 33 may be disposed around each optical opening or may be disposed to define each optical opening.

As shown in FIG. 3, in a plan view, an extending direction D2 (also referred to as a second direction) of the linear electrode portions 34a of the third electrode 34 intersects an extending direction D3 (also referred to as a third direction) of the linear electrode portions 36a of the fourth electrode 36. The intersection of the second direction D2 and the third direction D3 causes a difference between the direction of an electric field formed in the thickness direction of the liquid crystal layer 20 between the third electrode 34 and the active matrix substrate 10 side electrode(s) (first electrode 12 or second electrodes 14) and the direction of an electric field formed in the thickness direction of the liquid crystal layer 20 between the fourth electrode 36 and the active matrix substrate 10 side electrode(s). Thereby, the alignment azimuths in a plan view of the liquid crystal molecules 21 can be made different from each other. The angle θ2 formed by the second direction D2 and the third direction D3 is preferably 60° or greater and 90° or smaller. The lower limit of the angle θ2 is preferably 70°, more preferably 80°. The angle θ2 is particularly preferably 90°.

When at least one of the first electrode 12 or the second electrodes 14 includes linear electrode portions extending in the first direction D1, the extending direction D2 (second direction) of the linear electrode portions 34a of the third electrode 34 preferably forms an angle of 0° or greater and 30° or smaller with the first direction D1. The angle formed by the second direction D2 and the first direction D1 is more preferably 20° or smaller, still more preferably 10° or smaller. The extending direction D3 (third direction) of the linear electrode portions 36a of the fourth electrode 36 preferably forms an angle of 60° or greater and 90° or smaller with the first direction D1. The angle formed by the third direction D3 and the first direction D1 is more preferably 70° or greater, still more preferably 80° or greater.

An electrode width $L_{34}$ of one linear electrode portion 34a of the third electrode 34 and an electrode width $L_{36}$ of one linear electrode portion 36a of the fourth electrode 36 are each preferably 2 µm or greater and 5 µm or smaller, more preferably 3 µm or smaller. A distance (slit width) $S_{34}$ between two adjacent linear electrode portions 34a and a distance (slit width) $S_{36}$ between two adjacent linear electrode portions 36a can each be appropriately set according to the size of the sub-pixels. For example, the distance $S_{34}$ may be 2 µm or greater and 5 µm or smaller.

Figure 4:
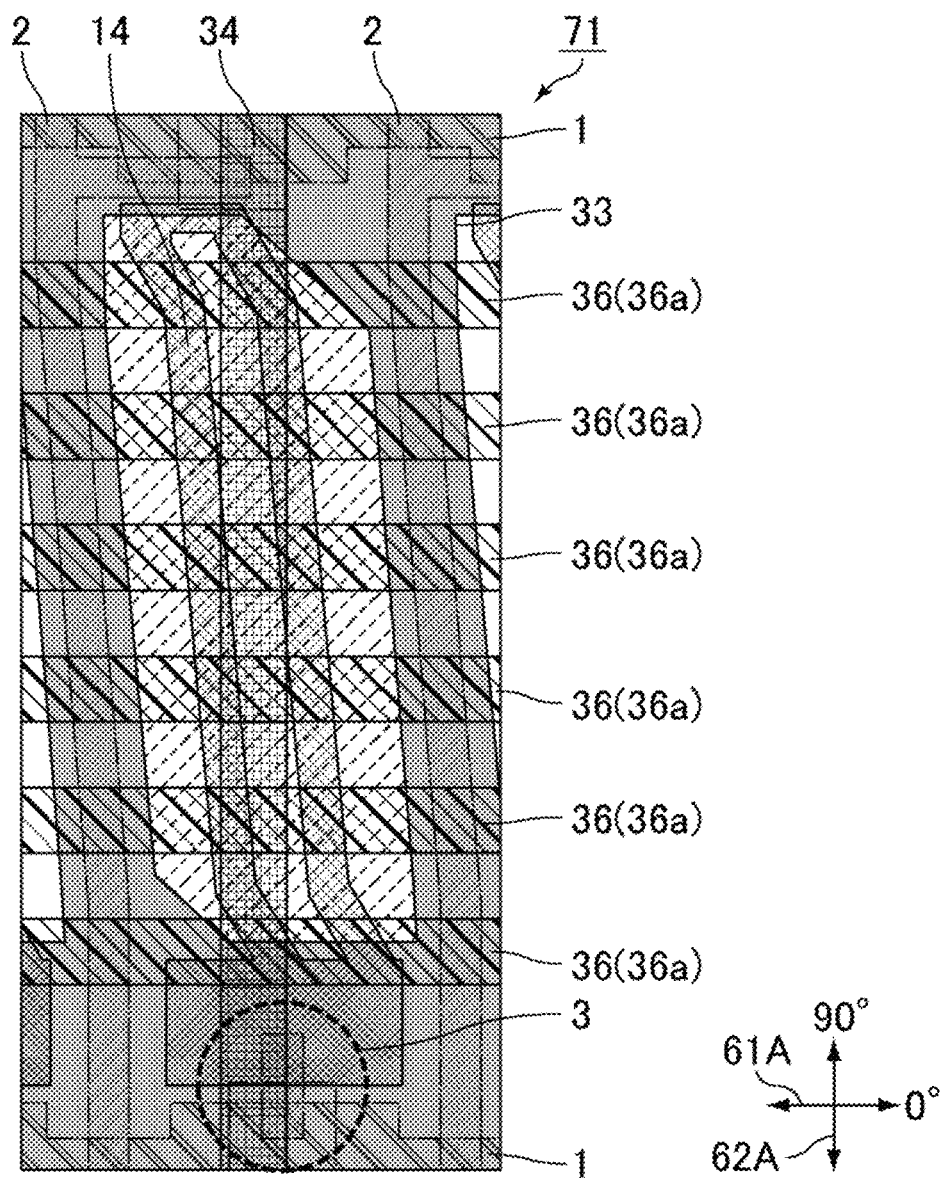
FIG. 4 is a schematic plan view of one sub-pixel of a liquid crystal display device having a different configuration for the third electrode.

The number of the linear electrode portions 34a and the number of the linear electrode portions 36a disposed for one sub-pixel can be appropriately set. For example, as shown in FIG. 2, two linear electrode portions 34a may be disposed for one sub-pixel along the absorption axis 62A of the second polarizer 62, and six linear electrode portions 36a may be disposed for one sub-pixel along the absorption axis 61A of the first polarizer 61. The two linear electrode portions 34a may be superimposed with the black matrix 33. FIG. 4 is a schematic plan view of one sub-pixel of a liquid crystal display device having a different configuration for the third electrode. As shown in FIG. 4, one linear electrode portion 34a may be provided in the center of one sub-pixel along the absorption axis 62A of the second polarizer 62.

The third electrode 34 and the fourth electrode 36 may each be a transparent electrode. Examples of the material for the transparent electrode include transparent conductive materials such as ITO and IZO. Each of the third electrode 34 and the fourth electrode 36 may be disposed for each sub-pixel, may be disposed for each group of multiple sub-pixels, or may be formed on the entire display region regardless of the boundaries of the sub-pixels. Preferably, multiple third electrodes 34 are electrically connected to each other in the entire display region and can apply a common constant voltage or a certain alternating voltage to the sub-pixels. Preferably, multiple fourth electrodes 36 are electrically connected to each other in the entire display region and can apply a common constant voltage or a certain alternating voltage to the sub-pixels.

The counter substrate 30 may include a first dielectric layer 37 between the color filters 32 and the third electrode 34. The first dielectric layer 37 can flatten the surfaces of the color filters 32 and reduce or prevent the occurrence of cracks in formation of the third electrode 34. The counter substrate 30 may further include a dielectric layer (second dielectric layer 38) between the fourth electrode 36 and the second alignment film 42. The second dielectric layer 38 can reduce or prevent the vertical electric field that unintendedly acts in the thickness direction of the liquid crystal layer 20 in the wide viewing angle mode where no voltage is applied to the third electrode 34 and the fourth electrode 36. As a result, the liquid crystal display device according to the embodiment functions as a horizontal electric field mode liquid crystal display device that generates a fringe electric field of a normal FFS mode liquid crystal display device including no electrodes on the counter substrate side, and thus can improve the mode efficiency as compared with the case without the second dielectric layer 38. The dielectric constant ε of the first dielectric layer 37 and the second dielectric layer 38 may be ε=3 to 4, for example. The first dielectric layer 37 and the second dielectric layer 38 each have a thickness of preferably 0.5 μm or greater and 4 μm or smaller. With the first dielectric layer 37 having a thickness of greater than 4 μm, parallax confusion may be caused to possibly reduce the display quality. The first dielectric layer 37 and the second dielectric layer 38 may each be a layer of a resin such as an acrylic resin or a polyimide resin.

The first alignment film 41 and the second alignment film 42 control the initial alignment azimuth of the liquid crystal molecules 21 with no voltage applied. In terms of improving the viewing angle characteristics, the first alignment film 41 and the second alignment film 42 are each preferably an alignment film (horizontal alignment film) which aligns the liquid crystal molecules 21 parallel to a surface of the active matrix substrate 10 and a surface of the counter substrate 30 with no voltage applied to the liquid crystal layer 20. The expression "aligns parallel to" means that the tilt angle (including the pre-tilt angle) of the liquid crystal molecules 21 is 0° to 5°, preferably 0° to 3°, more preferably 0° to 1° with respect to a reference surface.

The first alignment film 41 and the second alignment film 42 are each preferably a photoalignment film. The photoalignment film contains a photo-functional group such as an azobenzene group, a chalcone group, a cinnamate group, a coumarin group, a tolan group, a stilbene group, or a cyclobutane ring. The photo-functional group is a functional group that causes a change in its structure, such as dimerization (formation of dimers), isomerization, photo Fries rearrangement, or decomposition (cleavage) upon irradiation with light such as ultraviolet light or visible light (electromagnetic waves, preferably polarized light, more preferably polarized ultraviolet light, particularly preferably linearly polarized ultraviolet light), to exert alignment controlling force to liquid crystal molecules.

The liquid crystal display device according to the embodiment may include a backlight on the back surface of the liquid crystal panel 100. Examples of the backlight include an edge-lit backlight and a direct-lit backlight.

The liquid crystal display device according to the embodiment of the present invention includes the liquid crystal panel 100 and a control circuit 200. The control circuit 200 switches between the first display mode (also referred to as the narrow viewing angle mode) which allows a first image to be observable in a narrow viewing angle range including the normal direction of the liquid crystal panel and the second display mode (also referred to as the wide viewing angle mode) which allows the first image to be observable in a wide viewing angle range including the narrow viewing angle range.

The constant voltage is a reference voltage for driving the liquid crystal display device. For example, a certain voltage may be applied to the first electrode 12 or the second electrodes 14, or the first electrode 12 or the second electrodes 14 may be grounded. In the case where the constant voltage is applied to the third electrode 34 or the fourth electrode 36, the corresponding electrode may be electrically connected to the first electrode 12 or the second electrodes 14; the constant voltage common to the first electrode 12 or the second electrodes 14 may be applied to the corresponding electrode through a signal line different from the first electrode 12 or the second electrodes 14; or the third electrode 34 or the fourth electrode 36 may be grounded.

Herein, in a plan view of the liquid crystal panel with the absorption axis 61A of the first polarizer 61 defined at the 0°-180° azimuths and the absorption axis 62A of the second polarizer 62 defined at the 90°-270° azimuths, the top-bottom directions mean the 90°-270° azimuths, the left-right directions mean the 0°-180° azimuths, the oblique direction(s) means at least one of the 45° azimuth, the 135° azimuth, the 225° azimuth, or the 315° azimuth.

In the narrow viewing angle range, the contrast ratio is preferably lower than 2 when the liquid crystal panel is observed at a certain polar angle in at least the top-bottom directions (90°-270° azimuths) or the left-right directions (0°-180° azimuths). The polar angle is herein expressed according to the definition in which the direction vertical to the surface of the liquid crystal panel is defined as a polar angle of 0° and the direction parallel to the surface of the panel as a polar angle of 90°. The polar angle that allows the contrast ratio to be lower than 2 is preferably 60° or greater, more preferably 45° or greater, still more preferably 30° or greater, for example. The narrow viewing angle mode is preferably a mode that allows the contrast ratio to be lower than 2 at at least two or more azimuths selected from the azimuth angles 0°, 45°, 90°, 135°, 180°, 225°, 270°, or 315° in a polar angle range of 60° or greater and 90° or smaller.

The lower limit of the polar angle is more preferably 45°, still more preferably 30°. The wide viewing angle range means the range having a polar angle greater than that in the narrow viewing angle range. The wide viewing angle mode is preferably a mode that allows the contrast ratio to be 2 or higher at at least four or more azimuths selected from the azimuth angles 0°, 45°, 90°, 135°, 180°, 225°, 270°, or 315° in a polar angle range of 60° or greater and smaller than 90°. The lower limit of the polar angle is more preferably 45°, still more preferably 30°.

Hereinafter, display methods for the first display mode (narrow viewing angle mode) and the second display mode (wide viewing angle mode) are described with reference to the drawings. As described below, switching between the first display mode and the second display mode can be made by the control circuit 200 switching between application of an alternating voltage and application of a constant voltage to the third electrode 34 and the fourth electrode 36. The term "black display" means a display state with a minimum luminance (grayscale of 0), and the term "white display" means a display state with a maximum luminance (grayscale of 255). The following describes the case where the liquid crystal molecules 21 have a positive anisotropy of dielectric constant.

Figure 5C:
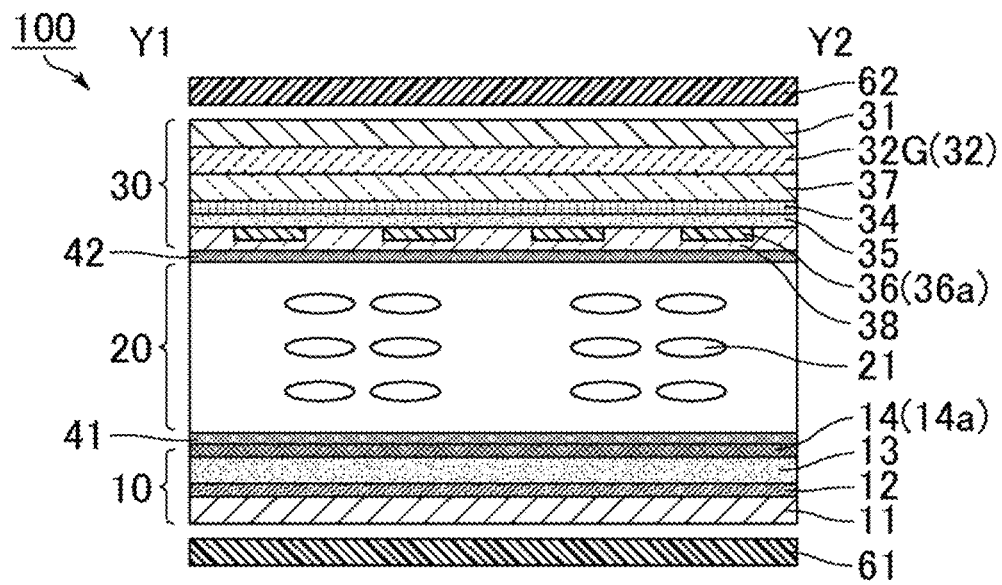
FIG. 5C is a schematic cross-sectional view taken along the line Y1-Y2 in FIG. 5A.

FIG. 5A is an enlarged schematic plan view of a part of FIG. 2 in black display in the wide viewing angle mode. FIG. 5B and FIG. 5C are schematic cross-sectional views taken along the line X1-X2 and the line Y1-Y2 in FIG. 5A, respectively. In the case of providing black display in the wide viewing angle mode, for example, the control circuit 200 applies a constant voltage (common voltage) to the second electrodes 14 and the first electrode 12 and also applies the constant voltage common to the first electrode 12 and the second electrodes 14 to the third electrode 34 and the fourth electrode 36. Here, no electric field is generated in the liquid crystal layer 20, and thus the liquid crystal molecules 21 are aligned at the initial alignment azimuth as shown in FIG. 5A. With the alignment azimuth of the liquid crystal molecules 21 set to be parallel to the absorption axis 61A of the first polarizer 61 or the absorption axis 62A of the second polarizer 62 in a plan view, black display is provided without light from the back surface of the liquid crystal panel passing through the liquid crystal layer 20. FIG. 5A to FIG. 5C show the case where the alignment azimuth of the liquid crystal molecules 21 is parallel to the absorption axis 62A of the second polarizer 62. As shown in FIG. 5B and FIG. 5C, the liquid crystal molecules 21 are preferably aligned parallel to the surface of the counter substrate 30 and the surface of the active matrix substrate 10 with no voltage applied to the liquid crystal layer 20.

Figure 6A:
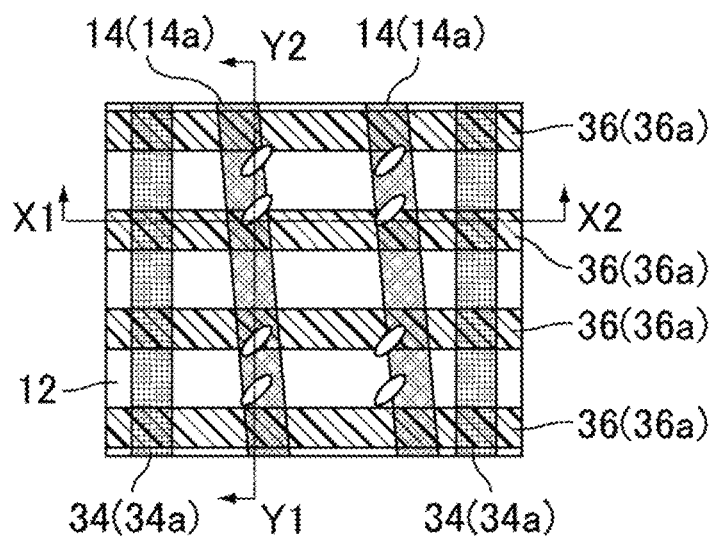
FIG. 6A is an enlarged schematic plan view of a part of FIG. 2 in white display in the wide viewing angle mode.
Figure 6B:
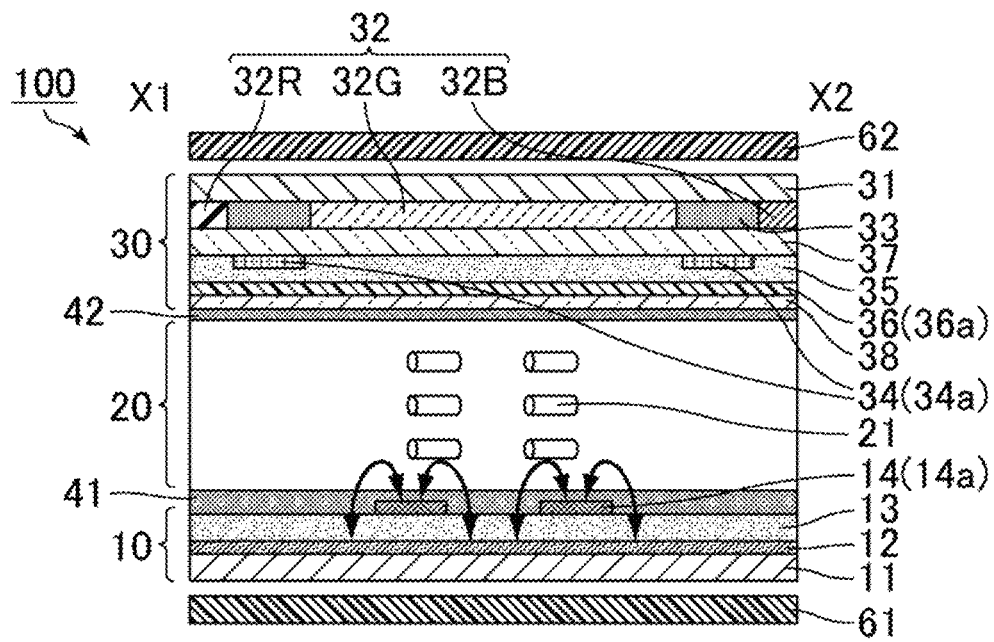
FIG. 6B is a schematic cross-sectional view taken along the line X1-X2 in FIG. 6A.
Figure 6C:
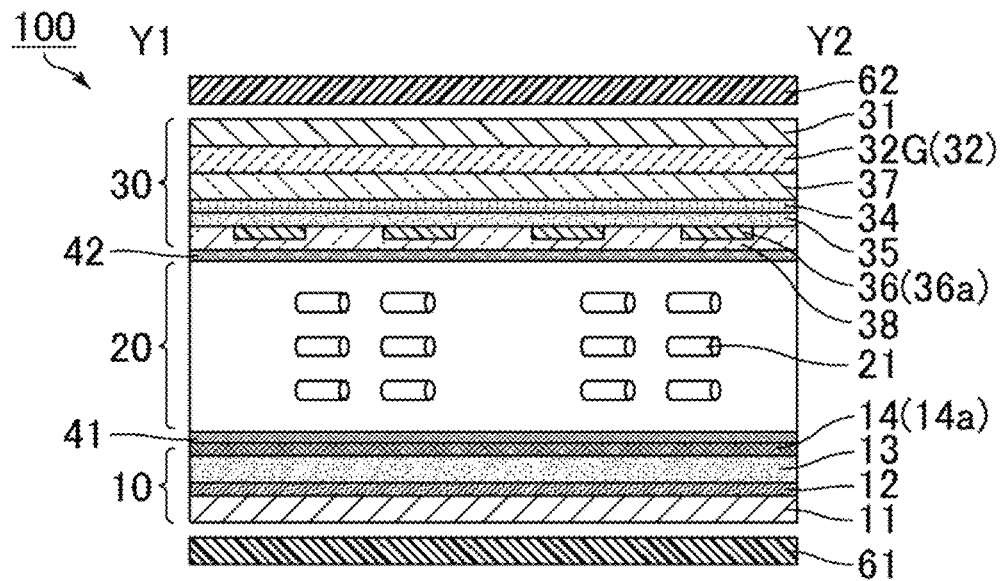
FIG. 6C is a schematic cross-sectional view taken along the line Y1-Y2 in FIG. 6A.

FIG. 6A is an enlarged schematic plan view of a part of FIG. 2 in white display in the wide viewing angle mode. FIG. 6B and FIG. 6C are schematic cross-sectional views taken along the line X1-X2 and the line Y1-Y2 in FIG. 6A, respectively. In the case of providing grayscale display in the wide viewing angle mode, the control circuit 200 applies a constant voltage to one of the first electrode 12 and the second electrodes 14 and applies a voltage different from the common voltage to the other while applying to the third electrode 34 and the fourth electrode 36 the constant voltage common to the first electrode 12 or the second electrodes 14. For example, when a common voltage is applied to the second electrodes 14, the alternating voltage applied to the first electrode is adjusted from 0 V to 4 V relative to the common voltage while applying the common voltage to the third electrode 34 and the fourth electrode 36, whereby grayscale display from black display to white display can be provided. As shown in FIG. 6B, a fringe electric field is formed between the first electrode 12 and the second electrodes 14. The fringe electric field formed between the first electrode 12 and the second electrodes 14 rotates the liquid crystal molecules 21 in the plane of the liquid crystal layer 20 and thereby changes the alignment azimuth of the liquid crystal molecules 21 from the initial alignment azimuth as shown in FIG. 6A to FIG. 6C. Thereby, the direction of the major axes of the liquid crystal molecules 21 forms angles with the absorption axis 61A of the first polarizer and with the absorption axis 62A of the second polarizer, to allow light to pass through from the back surface of the liquid crystal panel.

In the narrow viewing angle mode, for example, the control circuit 200 applies to one of the third electrode 34 and the fourth electrode 36 a constant voltage common to the second electrodes 14 or the first electrode 12 or an alternating voltage higher than the constant voltage, and applies to the other of the third electrode and the fourth electrode an alternating voltage higher than the voltage applied to the one of the third electrode and the fourth electrode. The liquid crystal display device according to the embodiment can change the azimuth of the viewing angle that is limited in the narrow viewing angle mode, by applying an alternating voltage to the third electrode 34 or the fourth electrode 36.

In the narrow viewing angle mode, the control circuit 200 switches between the first viewing angle limiting mode in which an alternating voltage higher than the voltage applied to the third electrode 34 is applied to the fourth electrode 36 and the second viewing angle limiting mode in which an alternating voltage higher than the voltage applied to the fourth electrode 36 is applied to the third electrode 34. The azimuth of the viewing angle is limited at different azimuth between the first viewing angle limiting mode and the second viewing angle limiting mode.

Figure 7A:
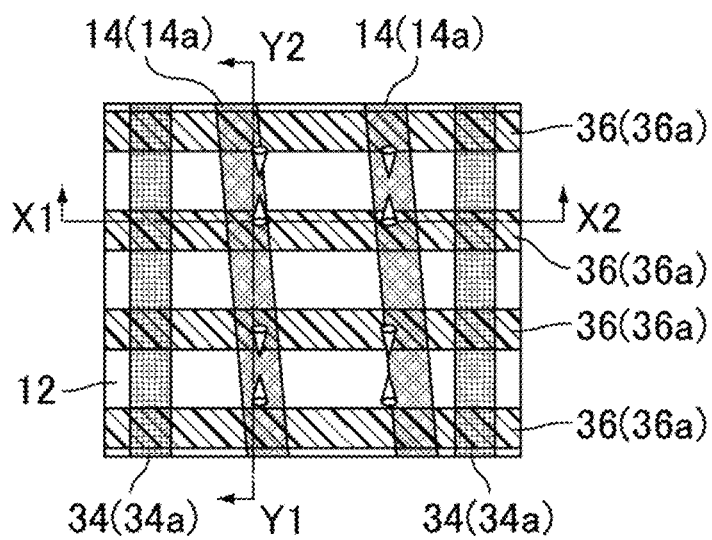
FIG. 7A is an enlarged schematic plan view of a part of FIG. 2 in black display in the first viewing angle limiting mode.
Figure 7B:
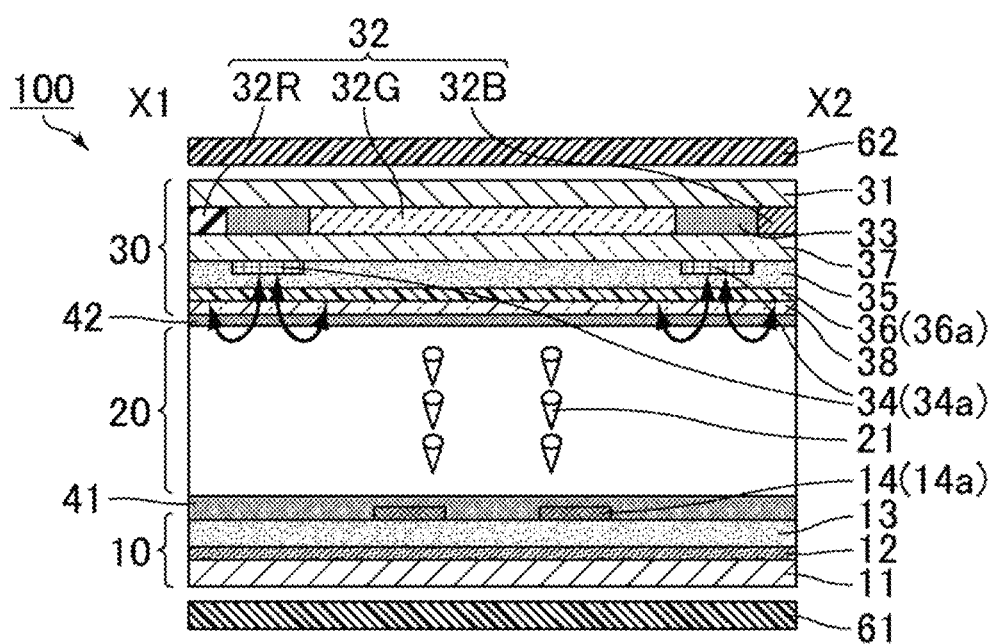
FIG. 7B is a schematic cross-sectional view taken along the line X1-X2 in FIG. 7A.
Figure 7C:
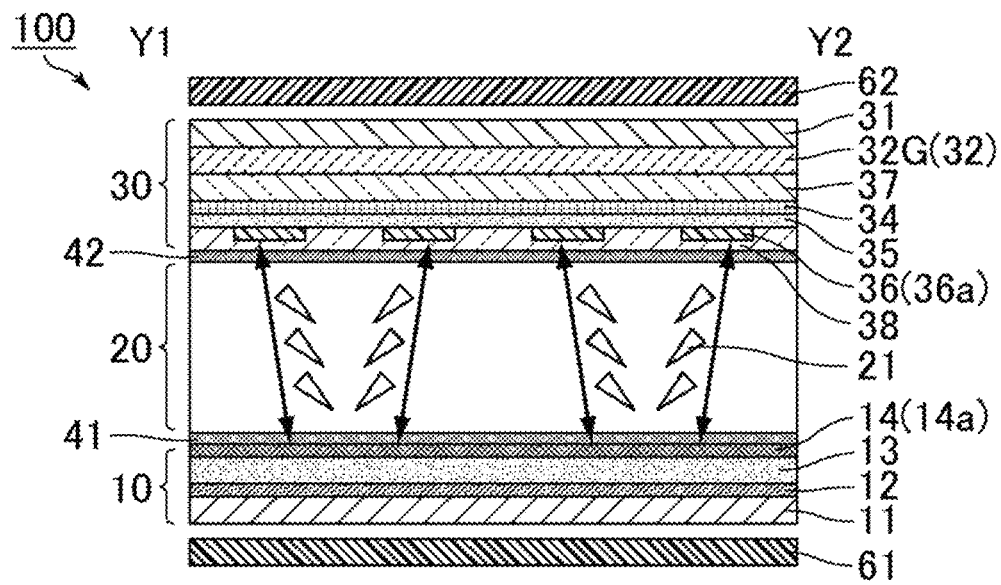
FIG. 7C is a schematic cross-sectional view taken along the line Y1-Y2 in FIG. 7A.

FIG. 7A is an enlarged schematic plan view of a part of FIG. 2 in black display in the first viewing angle limiting mode. FIG. 7B and FIG. 7C are schematic cross-sectional views taken along the line X1-X2 and the line Y1-Y2 in FIG. 7A, respectively. In the case of providing black display in the first viewing angle limiting mode, the control circuit 200 applies a constant voltage (common voltage) to the second electrodes 14 and the first electrode 12, applies to the third electrode 34 a constant voltage common to the first electrode 12 and the second electrode 14 or an alternating voltage higher than the constant voltage, and applies to the fourth electrode 36 an alternating voltage higher than the voltage applied to the third electrode 34. As shown in FIG. 7A, when the second electrodes 14 include the linear electrode portions 14a extending in the first direction D1 and the extending direction D3 (third direction) of the linear electrode portions 36a of the fourth electrode 36 forms an angle of 60° or greater and 90° or smaller with respect to the first direction D1, the liquid crystal molecules 21 are aligned in the third direction D3. As shown in FIG. 7B and FIG. 7C, the liquid crystal molecules 21 are aligned with an inclination relative to the surface of the counter substrate 30 under the influence of an electric field formed between the second electrodes 14 and the fourth electrode 36. In observation of the liquid crystal panel from the left-right directions, which means observation from the minor axis direction of the liquid crystal molecules 21, light leakage is observed in which light emitted from the back surface side of the liquid crystal panel is unintentionally observed from the viewer side of the liquid crystal panel. Observation of light leakage increases the luminance in black display in the first viewing angle limiting mode as compared with the luminance in black display in the wide viewing angle mode, whereby the screen looks whitish. In contrast, in observation of the liquid crystal panel from the up-down directions, which means observation from the major axis direction of the liquid crystal molecules 21, light leakage is not observed.

In the first viewing angle limiting mode, the alternating voltage applied to the fourth electrode 36 is preferably 0 V or more and 4 V or less relative to the voltage applied to the third electrode 34.

Figure 8A:
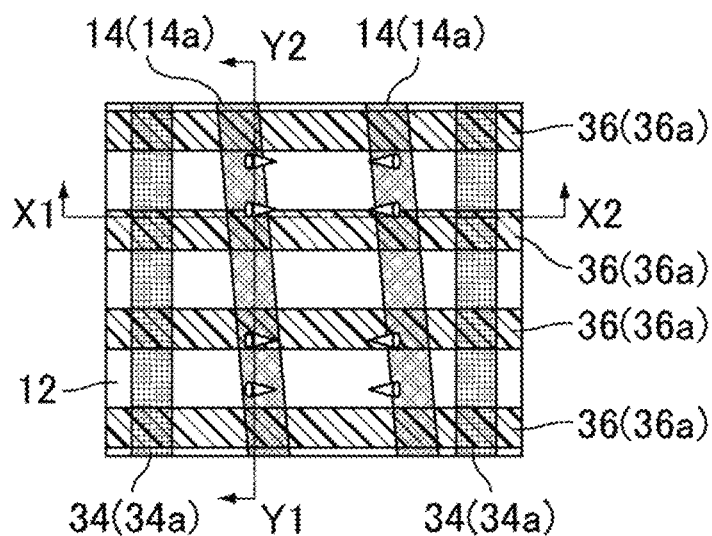
FIG. 8A is an enlarged schematic plan view of a part of FIG. 2 in white display in the first viewing angle limiting mode.
Figure 8B:
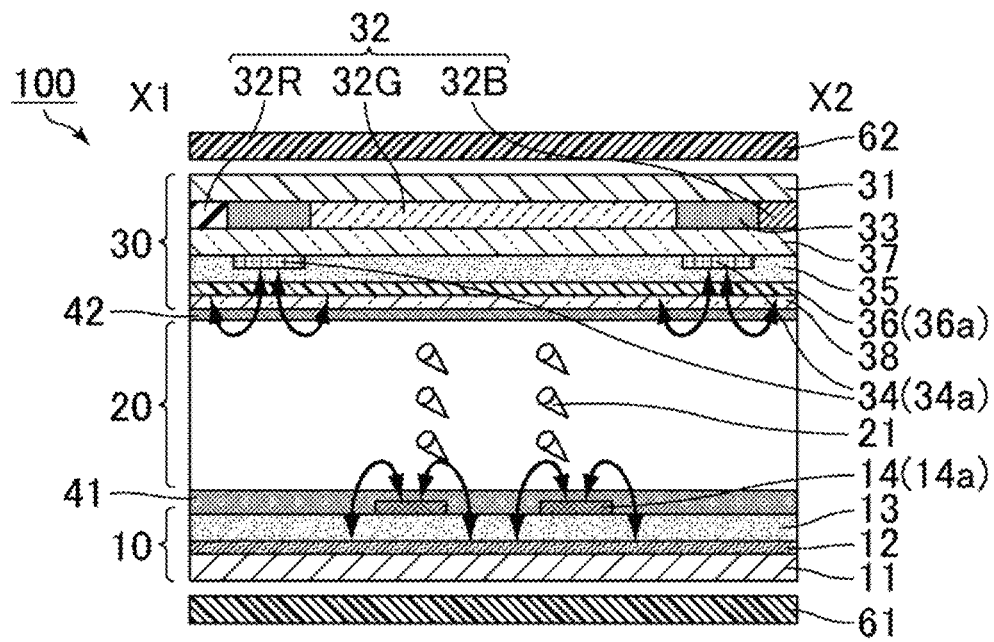
FIG. 8B is a schematic cross-sectional view taken along the line X1-X2 in FIG. 8A.
Figure 8C:
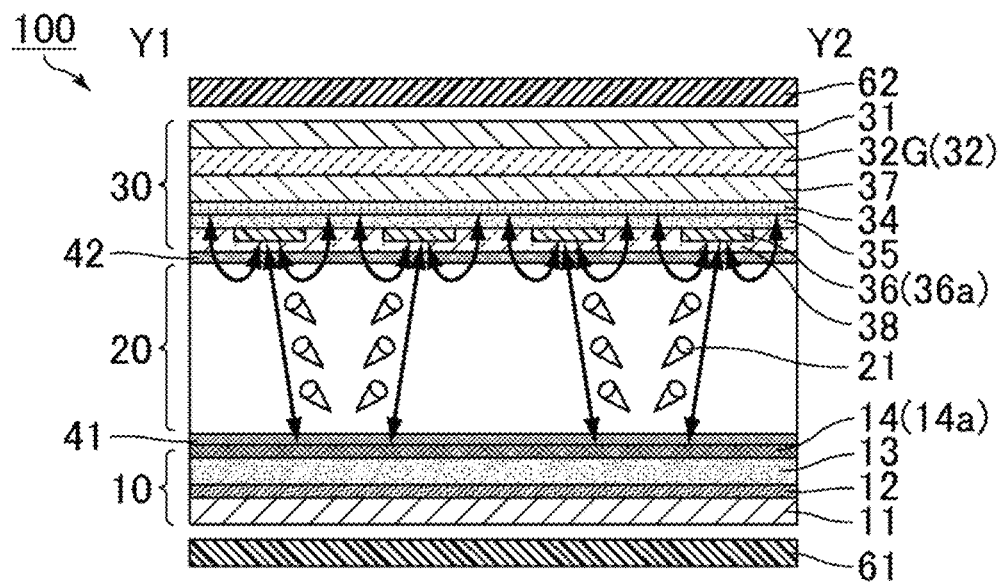
FIG. 8C is a schematic cross-sectional view taken along the line Y1-Y2 in FIG. 8A.

FIG. 8A is an enlarged schematic plan view of a part of FIG. 2 in white display in the first viewing angle limiting mode. FIG. 8B and FIG. 8C are schematic cross-sectional views taken along the line X1-X2 and the line Y1-Y2 in FIG. 8A, respectively. In the case of providing grayscale display in the first viewing angle limiting mode, the control circuit 200 applies a common voltage to one of the first electrode 12 and the second electrodes 14 and applies a voltage different from the common voltage to the other while applying to the third electrode 34 the common voltage or an alternating voltage higher than the common voltage and applying to the fourth electrode 36 an alternating voltage higher than the voltage applied to the third electrode 34. For example, when a common voltage is applied to the second electrodes 14, the alternating voltage applied to the first electrode is adjusted from 0 V to 4 V relative to the common voltage while applying the common voltage to the third electrode 34 and an alternating voltage of 4 V relative to the common voltage to the fourth electrode 36, whereby grayscale display from black display to white display can be provided. The liquid crystal molecules 21 are inclined relative to the surface of the counter substrate 30 by an oblique electric field formed between the second electrodes 14 and the fourth electrode 36 as shown in FIG. 8B and FIG. 8C and are rotated in the plane of the liquid crystal layer 20 by a fringe electric field formed between the first electrode 12 and the second electrodes 14 as shown in FIG. 8A, to allow light from the back surface of the liquid crystal panel to pass through the liquid crystal panel.

In the first viewing angle limiting mode, no light leakage is observed in the black display state in observation of the liquid crystal panel from the up-down directions. Thus, the contrast ratio can be similar to that in observation of the liquid crystal panel from the up-down directions in the wide viewing angle mode. In contrast, light leakage is observed in the black display state in observation of the liquid crystal panel from the left-right directions. Thus, the contrast ratio is lower than that in observation of the liquid crystal panel from the left-right directions in the wide viewing angle mode, and the display image is less likely to be observable, increasing the privacy from the left-right directions.

Figure 9A:
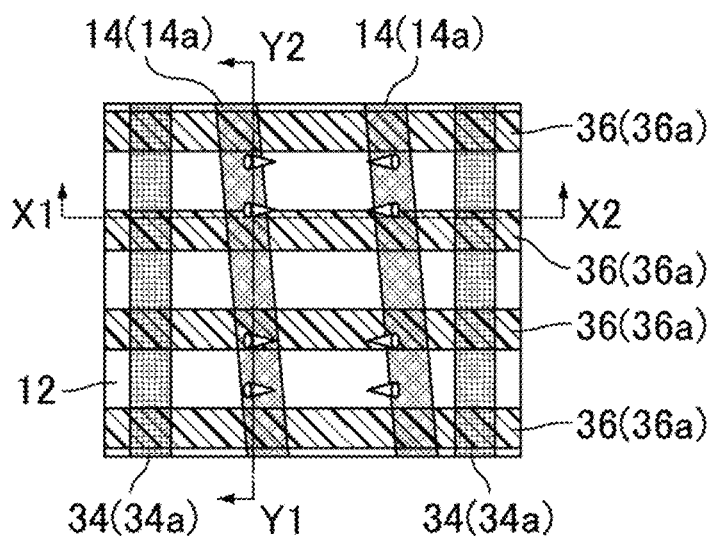
FIG. 9A is an enlarged schematic plan view of a part of FIG. 2 in black display in the second viewing angle limiting mode.
Figure 9B:
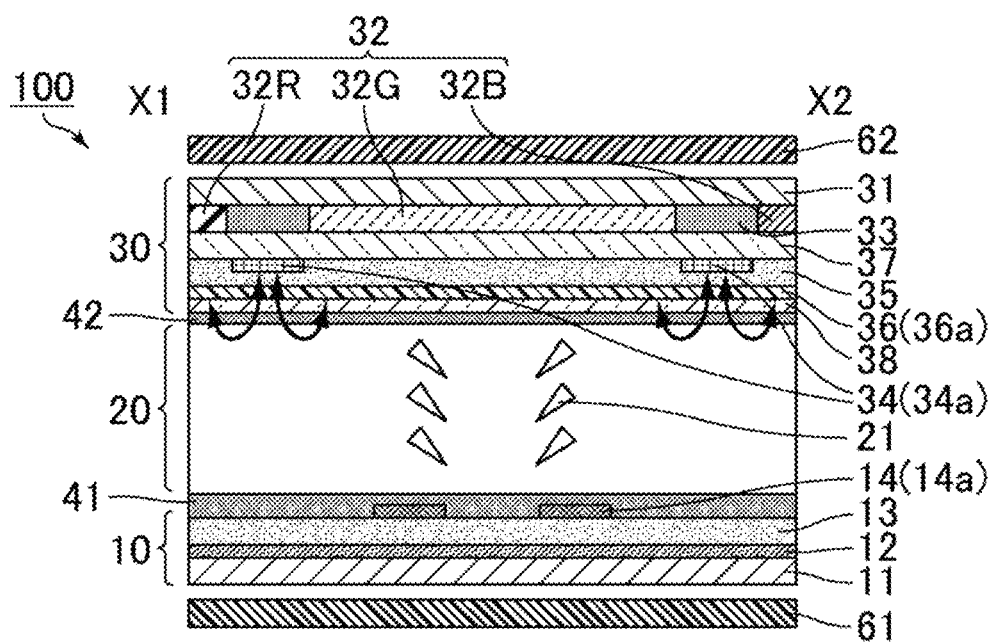
FIG. 9B is a schematic cross-sectional view taken along the line X1-X2 in FIG. 9A.
Figure 9C:
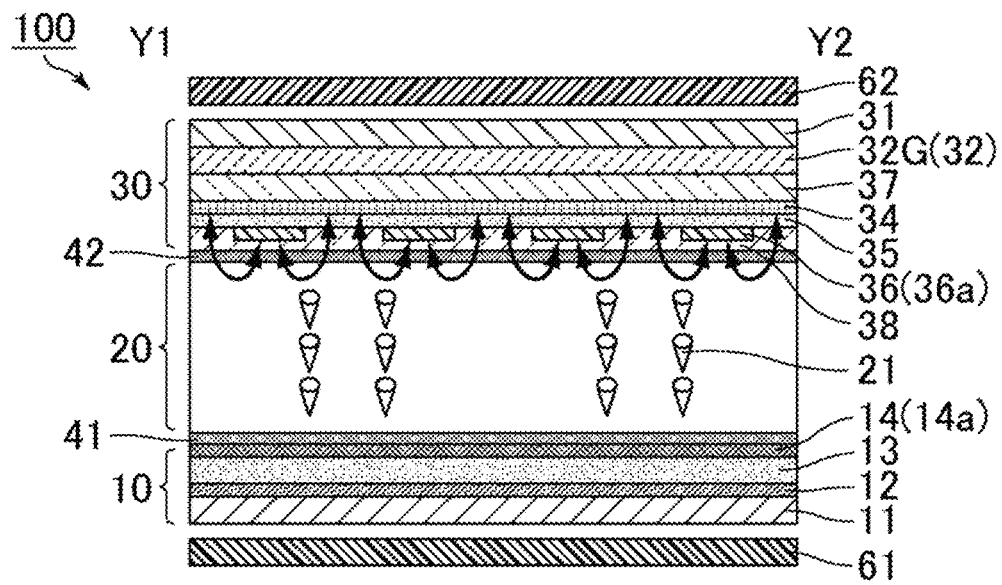
FIG. 9C is a schematic cross-sectional view taken along the line Y1-Y2 in FIG. 9A.

FIG. 9A is an enlarged schematic plan view of a part of FIG. 2 in black display in the second viewing angle limiting mode. FIG. 9B and FIG. 9C are schematic cross-sectional views taken along the line X1-X2 and the line Y1-Y2 in FIG. 9A, respectively. In the case of providing black display in the second viewing angle limiting mode, the control circuit 200 applies a constant voltage (common voltage) to the second electrodes 14 and the first electrode 12, applies to the fourth electrode 36 the constant voltage common to the first electrode 12 and the second electrodes 14 or an alternating voltage higher than the constant voltage, and applies to the third electrode 34 an alternating voltage higher than the voltage applied to the fourth electrode 36. As shown in FIG. 9A, when the extending direction D2 (second direction) of the linear electrode portions 34a of the third electrode 34 form an angle of 0° or greater and 30° or smaller with the first direction D1, the liquid crystal molecules 21 are aligned in the second direction D2 at an azimuth rotated by about 90° from the initial alignment azimuth in black display in the wide viewing angle mode. As shown in FIG. 9B and FIG. 9C, the liquid crystal molecules 21 are aligned while being inclined relative to the surface of the counter substrate 30 by an oblique electric field formed between the second electrodes 14 and the third electrode 34. In observation of the liquid crystal panel from the left-right directions, which means in observation from the major axis direction of the liquid crystal molecules 21, no light leakage is observed. Meanwhile, in observation of the liquid crystal panel from the up-down directions, which means in observation from the minor axis direction of the liquid crystal molecules 21, light leakage is observed. Thereby, the luminance of black display in the first viewing angle limiting mode is higher than the luminance of black display in the aforementioned wide viewing angle mode, whereby the screen looks whitish.

In the second viewing angle limiting mode, the alternating voltage applied to the third electrode 34 is preferably 3 V or more and less than 6 V relative to the voltage applied to the fourth electrode 36. When the alternating voltage applied to the fourth electrode 36 is 6 V or more relative to the voltage applied to the third electrode 34, the contrast ratio is low in observation from the normal direction of the liquid crystal panel to possibly cause the display image to be less perceivable. The voltage applied to the third electrode 34 is preferably 0 V or more and 4 V or less relative to the constant voltage.

Figure 10A:
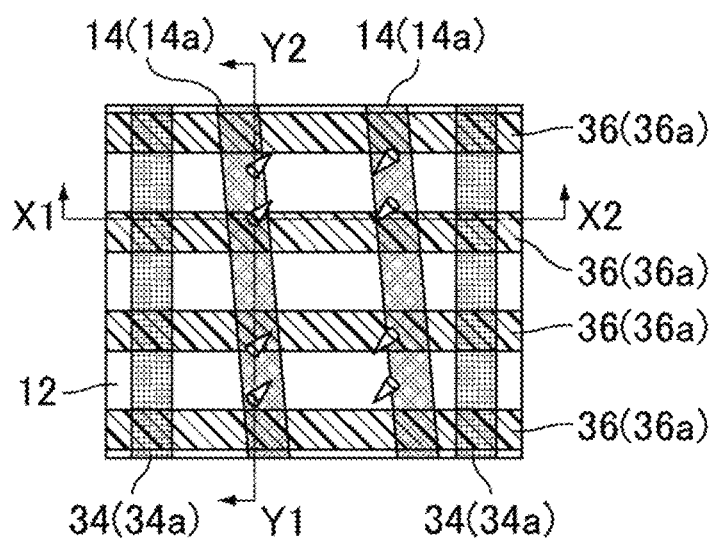
FIG. 10A is an enlarged schematic plan view of a part of FIG. 2 in white display in the second viewing angle limiting mode.
Figure 10B:
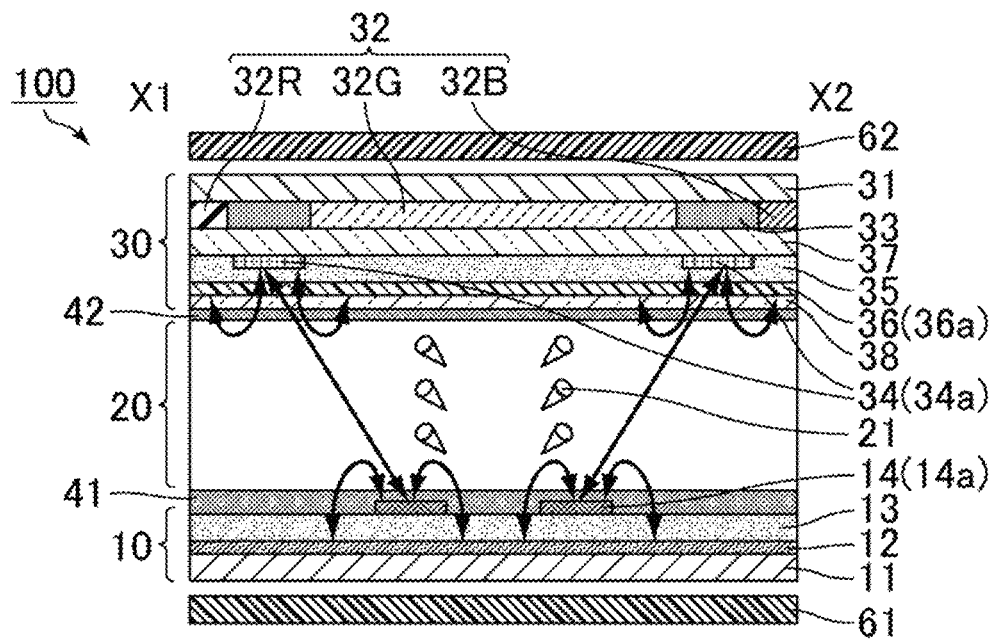
FIG. 10B is a schematic cross-sectional view taken along the line X1-X2 in FIG. 10A.
Figure 10C:
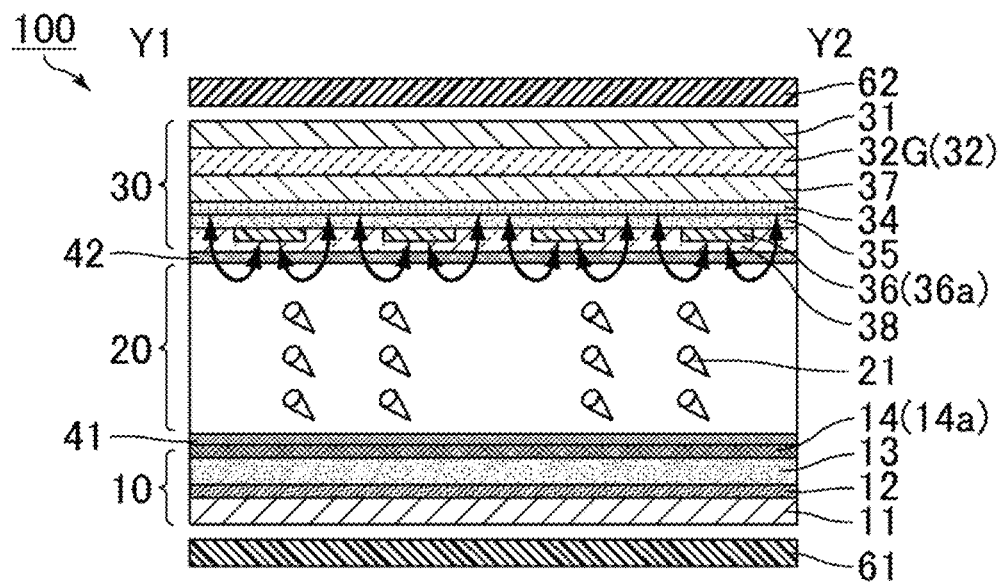
FIG. 10C is a schematic cross-sectional view taken along the line Y1-Y2 in FIG. 10A.

FIG. 10A is an enlarged schematic plan view of a part of FIG. 2 in white display in the second viewing angle limiting mode. FIG. 10B and FIG. 10C are schematic cross-sectional views taken along the line X1-X2 and the line Y1-Y2 in FIG. 10A, respectively. In the case of providing grayscale display in the second viewing angle limiting mode, the control circuit 200 applies a common voltage to one of the first electrode 12 and the second electrodes 14 and applies a voltage different from the common voltage to the other the first electrode 12 and the second electrodes 14 while applying to the fourth electrode 36 the common voltage or an alternating voltage higher than the common voltage and applying to the third electrode 34 an alternating voltage higher than the voltage applied to the fourth electrode 36. For example, when a common voltage is applied to the second electrodes 14, the alternating voltage applied to the first electrode is adjusted from 0 V to 4 V relative to the common voltage while applying the common voltage to the fourth electrode 36 and applying an alternating voltage of 4 V relative to the common voltage to the third electrode 34, whereby grayscale display from black display to white display can be provided. In another example, grayscale display may be provided by applying to the fourth electrode 36 an alternating voltage of 4 V relative to the common voltage and applying to the third electrode 34 an alternating voltage of 8 V relative to the common voltage. The liquid crystal molecules 21 are inclined relative to the surface of the counter substrate 30 by an oblique electric field formed between the second electrodes 14 and the third electrode 34 as shown in FIG. 10B and FIG. 10C and are rotated in the plane of the liquid crystal layer 20 by a fringe electric field formed between the first electrode 12 and the second electrodes 14 as shown in FIG. 10A, to allow light from the back surface of the liquid crystal panel to pass through the liquid crystal panel.

In the second viewing angle limiting mode, in observation of the liquid crystal panel from the left-right directions, no light leakage is observed in a black display state. Thus, the contrast ratio can be similar to that in observation of the liquid crystal panel from the left-right directions in the wide viewing angle mode. In contrast, in observation of the liquid crystal panel from the up-down directions, light leakage is observed in a black display state. Thus, the contrast ratio is lower than that in observation of the liquid crystal panel from the up-down directions in the wide viewing angle mode to allow the display image to be less perceivable, increasing the privacy from the up-down directions.

Figure 11A:
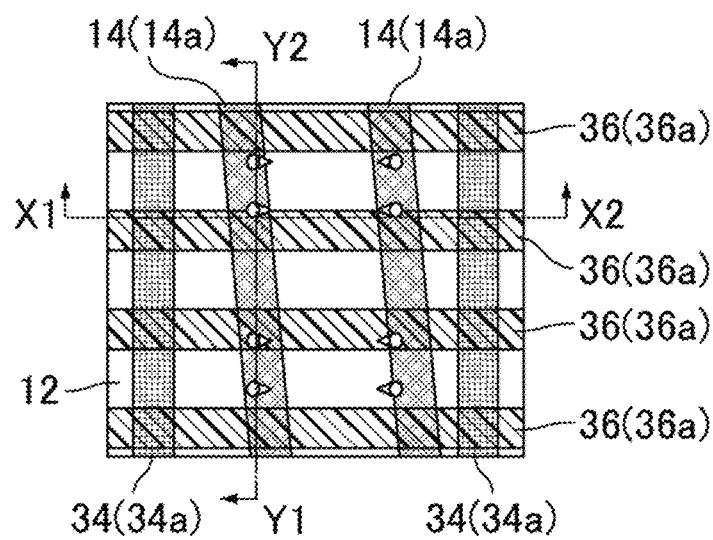
FIG. 11A is an enlarged schematic plan view of a part of FIG. 2 in black display in the third display mode.
Figure 11B:
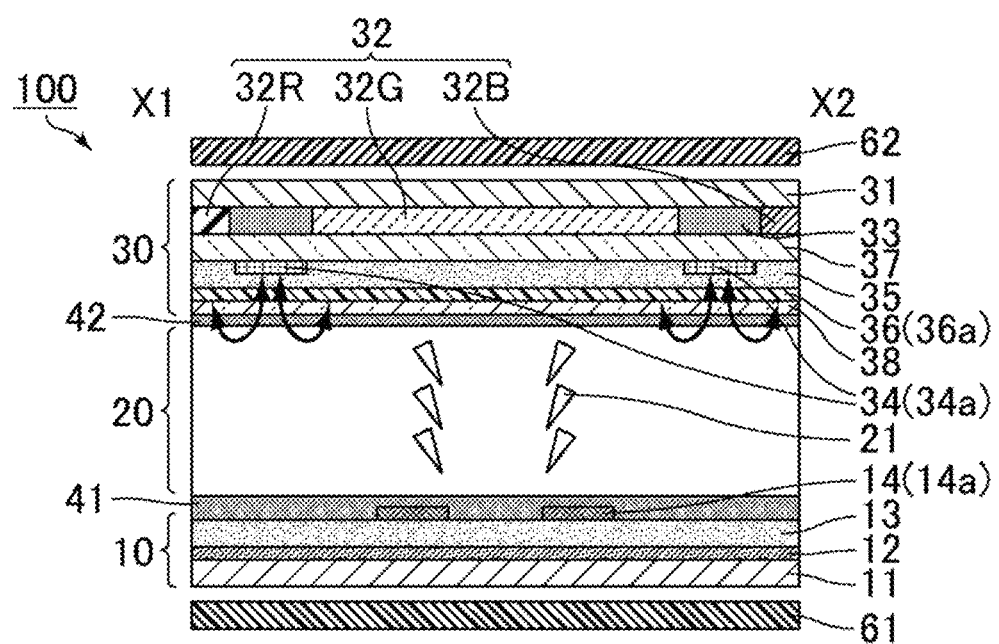
FIG. 11B is a schematic cross-sectional view taken along the line X1-X2 in FIG. 11A.
Figure 11C:
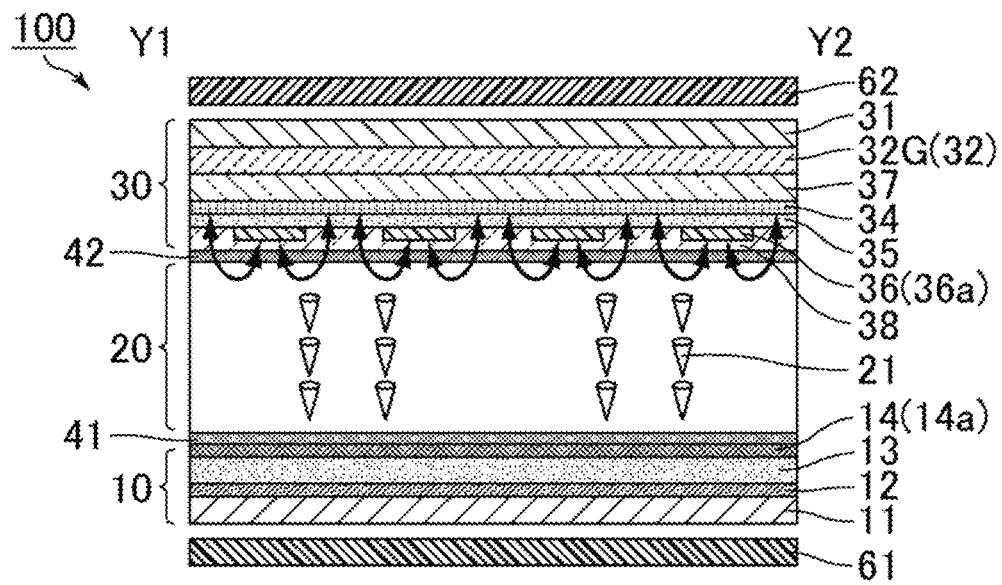
FIG. 11C is a schematic cross-sectional view taken along the line Y1-Y2 in FIG. 11A.

Furthermore, the control circuit 200 can also switch to a third display mode in which the contrast ratio is reduced in observation of the liquid crystal panel from the normal direction, by applying a higher alternating voltage to the fourth electrode 36. FIG. 11A is an enlarged schematic plan view of a part of FIG. 2 in black display in the third display mode. FIG. 11B and FIG. 11C are schematic cross-sectional views taken along the line X1-X2 and the line Y1-Y2 in FIG. 11A, respectively. In the case of providing black display in the third display mode, an alternating voltage higher than the voltage applied to the fourth electrode 36 in the second viewing angle limiting mode is applied to the fourth electrode 36. Accordingly, an oblique electric field stronger than in the second viewing angle limiting mode is formed between the second electrodes 14 and the third electrode 34. As a result, as shown in FIG. 11A, the liquid crystal molecules 21 are aligned in the second direction D2. However, as shown in FIG. 11B and FIG. 11C, a strong electric field is generated in the thickness direction of the liquid crystal layer 20. Thereby, the inclination of the liquid crystal molecules 21 relative to the surface of the counter substrate 30 increases to cause more light leakage.

In the third display mode, the alternating voltage applied to the third electrode 34 is preferably 6 V or more relative to the voltage applied to the fourth electrode 36. The upper limit of the alternating voltage applied to the third electrode 34 is 10 V relative to the voltage applied to the fourth electrode 36, for example. The voltage applied to the fourth electrode 36 is preferably 0 V or more and 4 V or less relative to the constant voltage.

Figure 12A:
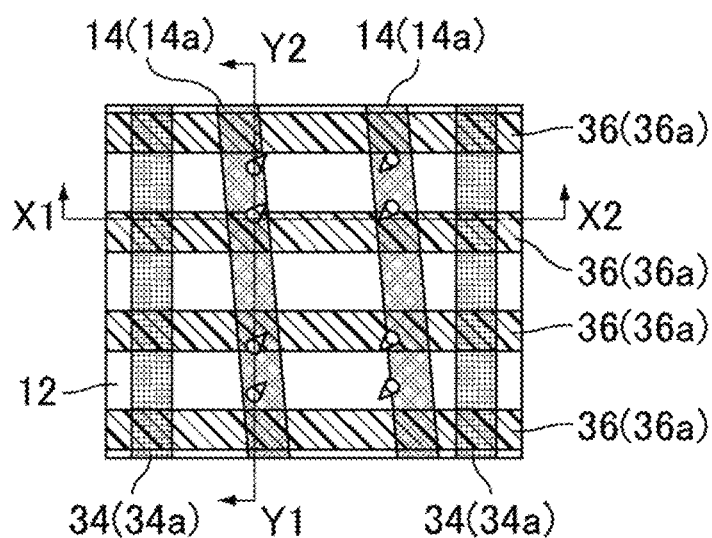
FIG. 12A is an enlarged schematic plan view of a part of FIG. 2 in white display in the third display mode.
Figure 12B:
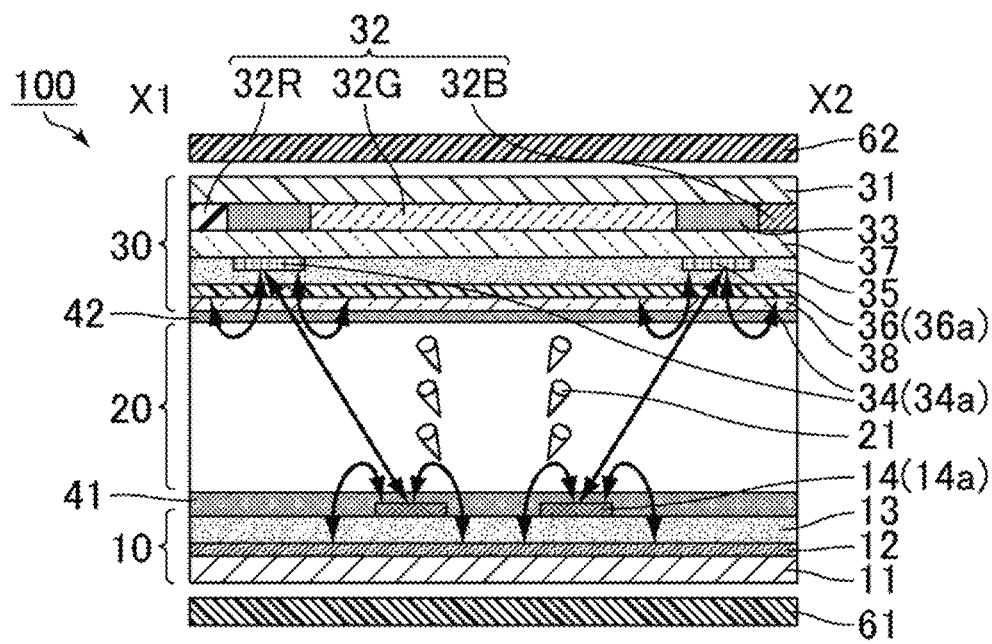
FIG. 12B is a schematic cross-sectional view taken along the line X1-X2 in FIG. 12A.
Figure 12C:
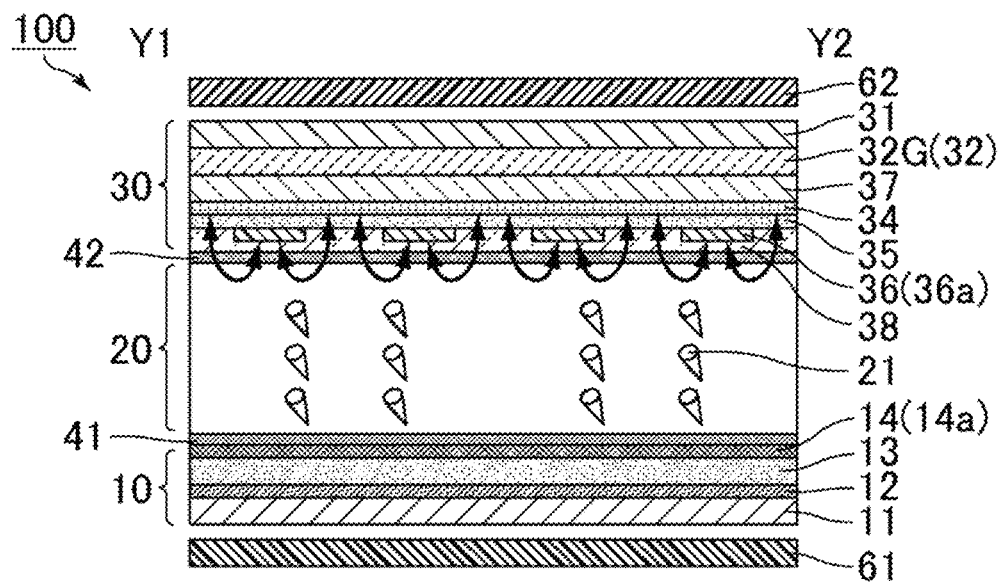
FIG. 12C is a schematic cross-sectional view taken along the line Y1-Y2 in FIG. 12A.

FIG. 12A is an enlarged schematic plan view of a part of FIG. 2 in white display in the third display mode. FIG. 12B and FIG. 12C are schematic cross-sectional views taken along the line X1-X2 and the line Y1-Y2 in FIG. 12A, respectively. In the case of providing grayscale display in the third display mode, the liquid crystal molecules are inclined relative to the surface of the counter substrate 30 by an oblique electric field formed between the second electrodes 14 and the third electrode 34 as shown in FIG. 12B and FIG. 12C and are rotated in the plane of the liquid crystal layer 20 by a fringe electric field formed between the first electrode 12 and the second electrodes 14 as shown in FIG. 12A. In the third display mode, the contrast ratio is high in observation of the liquid crystal panel from the left-right directions, and thus the display image is perceivable in observation of the liquid crystal panel from the left-right directions. In contrast, the liquid crystal molecules 21 around the center of each sub-pixel provide a reduced contrast ratio in observation of the liquid crystal panel from the normal direction to cause the display image to be less perceivable.

Figure 13:
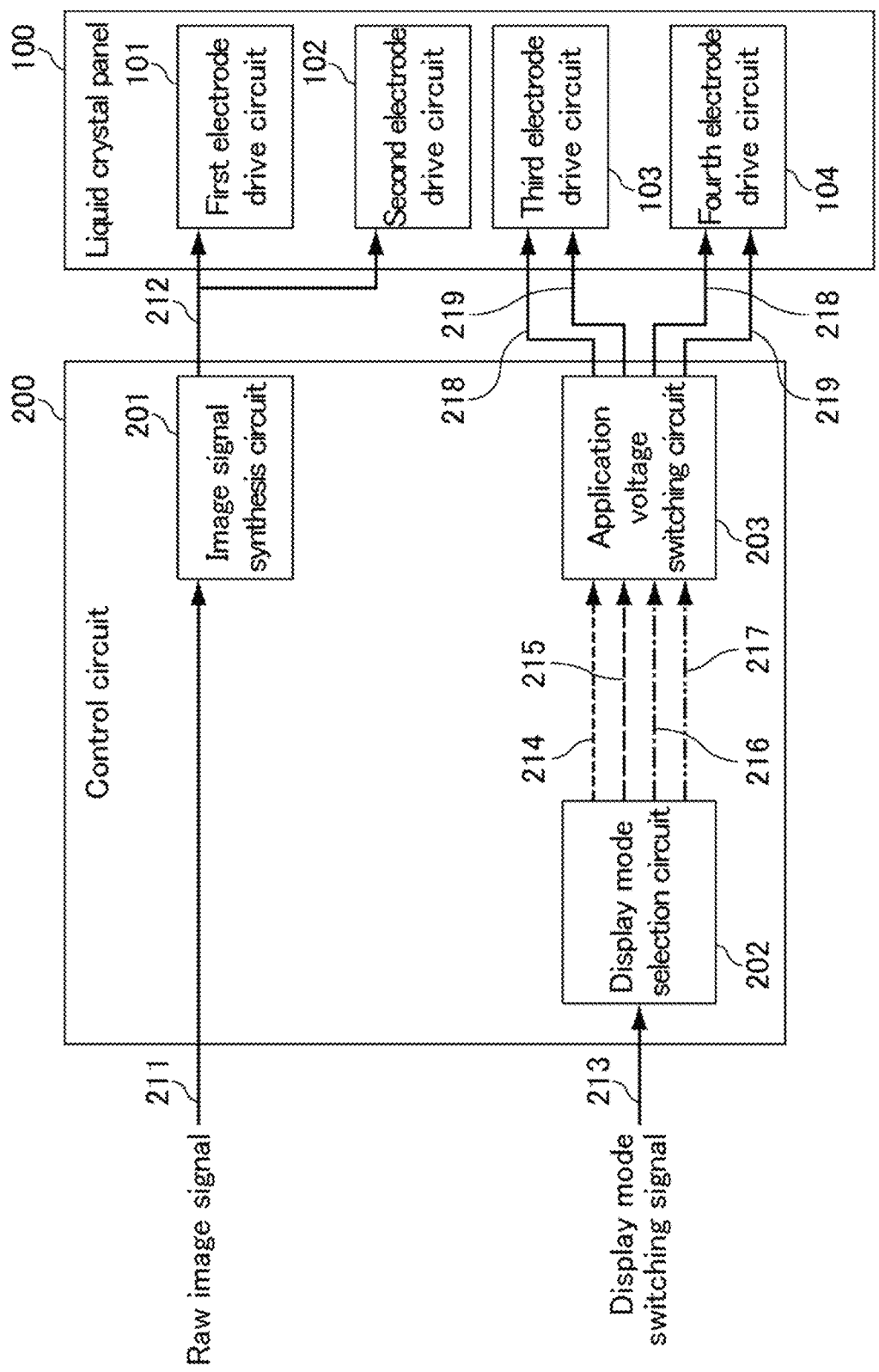
FIG. 13 is a block diagram schematically showing display methods for a first display mode, a second display mode, and a third display mode.

FIG. 13 is a block diagram schematically showing display methods for the first display mode, the second display mode, and the third display mode. As shown in FIG. 13, the liquid crystal panel 100 may include a first electrode drive circuit 101 that applies voltage to the first electrode 12, a second electrode drive circuit 102 that applies voltage to the second electrodes 14, a third electrode drive circuit 103 that applies voltage to the third electrode 34, and a fourth electrode drive circuit 104 that applies voltage to the fourth electrode 36.

The control circuit 200 may include an image signal synthesis circuit 201, a display mode selection circuit 202, and an application voltage switching circuit 203.

The image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The display mode selection circuit 202 receives a display mode switching signal 213 for switching between the first display mode (narrow viewing angle mode), the second display mode (wide viewing angle mode), and the third display mode. The first display mode (narrow viewing angle mode) may include a first viewing angle limiting mode and a second viewing angle limiting mode as described in the above. The first viewing angle limiting mode allows a display image to be less perceivable in observation of the liquid crystal panel from the left-right directions. The second viewing angle limiting mode allows the display image to be less perceivable in observation of the liquid crystal panel from the up-down directions. The liquid crystal display device according to the embodiment can ensure high privacy by switching from the second display mode (wide viewing angle mode) to the first display mode (narrow viewing angle mode). The third display mode allows the display image to be less perceivable in observation of the liquid crystal panel from the normal direction.

The application voltage switching circuit 203 inputs an alternating signal 218 or a constant voltage signal 219 to the third electrode drive circuit 103 according to the received display mode selection signal so as to switch between application of an alternating voltage and application of a constant voltage to the third electrode 34. The application voltage switching circuit 203 inputs the alternating signal 218 or the constant voltage signal 219 to the fourth electrode drive circuit 104 according to the received display mode selection signal so as to switch between application of an alternating voltage and application of a constant voltage to the fourth electrode 36.

When the first viewing angle limiting mode is selected, the display mode selection circuit 202 outputs a first viewing angle limiting mode selection signal 214 to the application voltage switching circuit 203. When receiving the first viewing angle limiting mode selection signal 214 from the display mode selection circuit 202, the application voltage switching circuit 203 outputs the constant voltage signal 219 to the third electrode drive circuit 103, whereby a constant voltage common to the first electrode 12 or the second electrodes 14 is applied to the third electrode 34, or the application voltage switching circuit 203 outputs the alternating signal 218 to the third electrode drive circuit 103, whereby a certain alternating voltage is applied to the third electrode 34. Furthermore, the application voltage switching circuit 203 outputs the alternating signal 218 to the fourth electrode drive circuit 104, whereby a voltage higher than the voltage applied to the third electrode 34 is applied to the fourth electrode 36.

When the second viewing angle limiting mode is selected, the display mode selection circuit 202 outputs a second viewing angle limiting selection signal 215 to the application voltage switching circuit 203. When receiving the second viewing angle limiting selection signal 215 from the display mode selection circuit 202, the application voltage switching circuit 203 outputs the constant voltage signal 219 to the fourth electrode drive circuit 104, whereby a constant voltage common to the first electrode 12 or the second electrodes 14 is applied to the fourth electrode 36, or the application voltage switching circuit 203 outputs the alternating signal 218 to the fourth electrode drive circuit 104, whereby a certain alternating voltage is applied to the fourth electrode 36. Furthermore, the application voltage switching circuit 203 outputs the alternating signal 218 to the third electrode drive circuit 103, whereby a voltage higher than the voltage applied to the fourth electrode 36 is applied to the third electrode 34.

When the second display mode is selected, the display mode selection circuit 202 outputs a second display mode selection signal 216 to the application voltage switching circuit 203. When receiving the second display mode selection signal 216 from the display mode selection circuit 202, the application voltage switching circuit 203 outputs the constant voltage signal 219 to the third electrode drive circuit 103 and the fourth electrode drive circuit 104, whereby a constant voltage common to the first electrode 12 or the second electrodes 14 is applied to the third electrode 34 and the fourth electrode 36.

When the third display mode is selected, the display mode selection circuit 202 outputs a third display mode selection signal 217 to the application voltage switching circuit 203. When receiving the third display mode selection signal 217 from the display mode selection circuit 202, the application voltage switching circuit 203 applies to the third electrode 34 the constant voltage common to the first electrode 12 or the second electrodes 14 or a certain alternating voltage and applies to the fourth electrode 36 a voltage higher than the voltage applied to the third electrode 34, similarly to the case of receiving the second viewing angle limiting mode selection signal 215. Furthermore, the application voltage switching circuit 203 applies to the fourth electrode 36 an alternating voltage that is higher than the voltage applied to the third electrode 34 and is higher than the voltage applied to the fourth electrode 36 in the case of receiving the second viewing angle limiting mode selection signal 215.

A finding was made in which the liquid crystal display device according to the embodiment can ensure high privacy in observation of the liquid crystal panel from oblique directions by incorporating the later-described veil view function in addition to switching the display modes. The veil-view function can be used in combination with either the first display mode or the second display mode. Still, combination with the first display mode can further increase the privacy. The first viewing angle limiting mode and the second viewing angle limiting mode in the first display mode achieve the effect of reducing the viewing angle from the left-right directions and the up-down directions of the liquid crystal panel, respectively, but the effect is limited. Meanwhile, use of the veil-view function as shown in JP 2011-253206 A alone achieves the effect of reducing the viewing angle at a 45 degrees azimuth, but the effect is limited at the left-right directions and in the up-down directions. Combination of switching the display modes and the veil-view function achieves a complementary effect, whereby an excellent effect of reducing the viewing angle is exerted in the left-right directions at a 45 degrees azimuth and in the up-down directions at a 45 degrees azimuth. An embodiment based on this finding is described below.

Hereinafter, an exemplary method for displaying an image using the veil-view function is described with reference to FIG. 14 to FIG. 19. FIG. 14, FIG. 15, FIG. 17 and FIG. 18 schematically show the first sub-pixel 70 and the second sub-pixel 71 shown in the drawings including FIG. 1.

Figure 14:
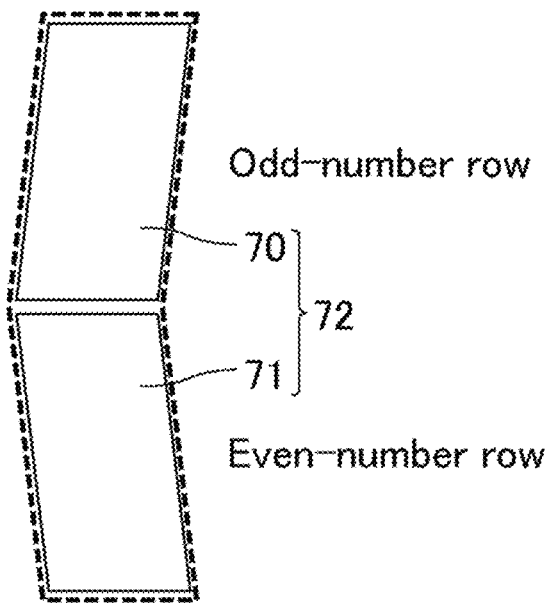
FIG. 14 is a schematic plan view of an exemplary display unit in a liquid crystal panel.
Figure 15:
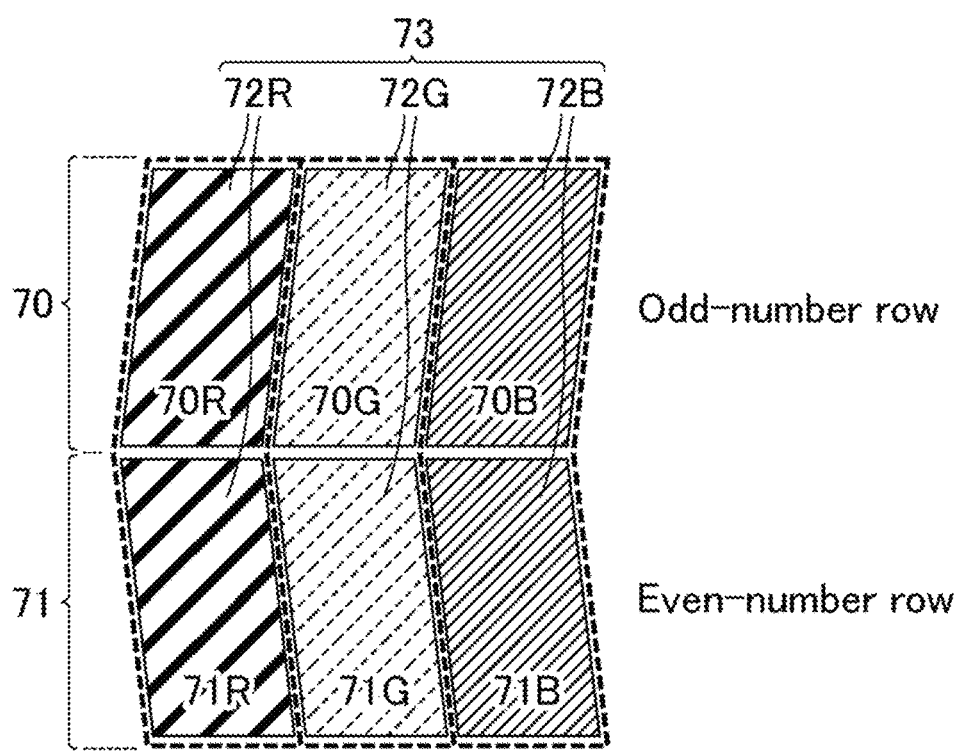
FIG. 15 is a schematic plan view of an exemplary color element for color display using the veil-view function.

FIG. 14 is a schematic plan view of an exemplary display unit in a liquid crystal panel. FIG. 15 is a schematic plan view of an exemplary color element for color display using the veil-view function. The liquid crystal panel 100 preferably includes display units 72 for displaying an image using the veil-view function. As shown in FIG. 14, the display units 72 each include a pair of sub-pixels arranged adjacent to each other, one of the sub-pixels being a first sub-pixel 70 selected from odd-number rows and the other being a second sub-pixel 71 selected from even-number rows. The first sub-pixel 70 and the second sub-pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71 as shown in FIG. 15 described later. For color display by a normal display method, the pixels including red, green, and blue pixels are independently driven. In the normal color display, the display can be provided at a resolution twice that of the color display using the veil-view function.

As shown in FIG. 15, for color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

An image can be displayed using the veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed in the narrow viewing angle range, the luminance of the first sub-pixel 70 and the luminance of the second sub-pixel 71 are spatially averaged to be recognized as the luminance of the raw image. Meanwhile, when the panel is observed in the wide viewing angle range, the luminances are recognized as the luminance Data 1+Data 2 or the luminance Data 1−Data 3.

Figure 16:
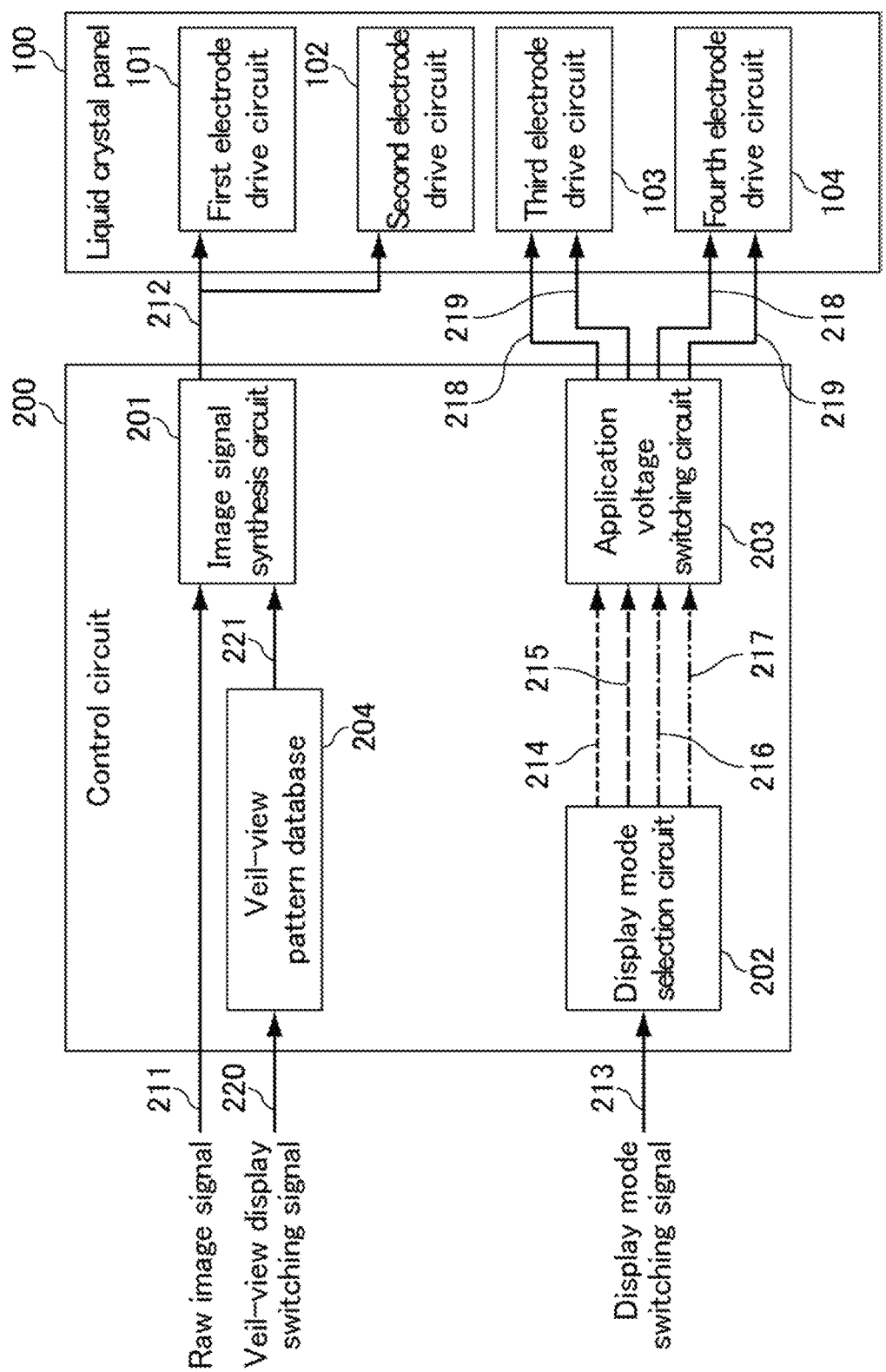
FIG. 16 is a block diagram schematically showing a method for displaying a veil-view pattern.

Hereinafter, the method of displaying a veil-view pattern is described with reference to FIG. 16. FIG. 16 is a block diagram schematically showing a method for displaying a veil-view pattern. The control circuit 200 inputs different image signals to the first sub-pixel 70 and the second sub-pixel 71 such that a second image different from the first image is observed in the wide viewing angle range. Such a display method is also referred to as the veil-view function. Display using the veil-view function can enhance the privacy in combination with either the first display mode (narrow viewing angle mode) or the second display mode (wide viewing angle mode). Still, the privacy can be further enhanced in combination with the first display mode (narrow viewing angle mode).

As shown in FIG. 16, the control circuit 200 may further include the database 204 in which information related to the veil-view patterns is stored. When receiving a veil-view display switching signal 220, the database 204 outputs a veil-view pattern image signal 221 to the image signal synthesis circuit 201. The image signal synthesis circuit 201 outputs an image signal 212 formed by synthesis of the raw image signal 211 and the veil-view pattern image signal 221 to the first electrode drive circuit 101 and the second electrode drive circuit 102.

For example, when the second electrode drive circuit 102 applies a constant voltage (common voltage) to the second electrodes 14, the first electrode drive circuit 101 applies different magnitudes of voltage to the first electrode(s) 12 corresponding to the first sub-pixel 70 and the second sub-pixel 71 such that the second image is observed in the wide viewing angle range. In this case, one first electrode 12 is preferably provided in each sub-pixel. When the first electrode drive circuit 101 applies a constant voltage to the first electrode 12, the second electrode drive circuit 102 applies different magnitudes of voltage to the second electrodes 14 corresponding to the first sub-pixel 70 and the second sub-pixel 71 such that the second image is observed in the wide viewing angle range.

Figure 17:
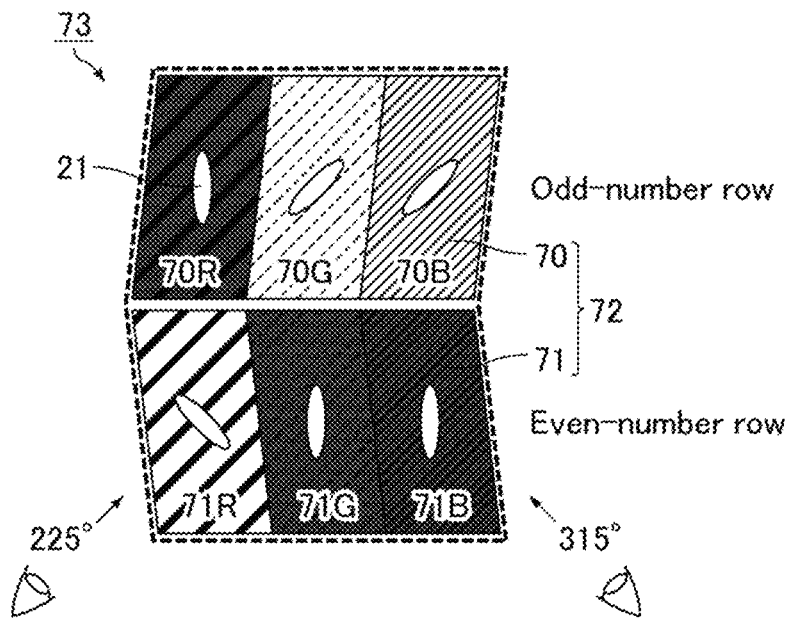
FIG. 17 is a schematic plan view of an exemplary display pattern for a color element.
Figure 18:
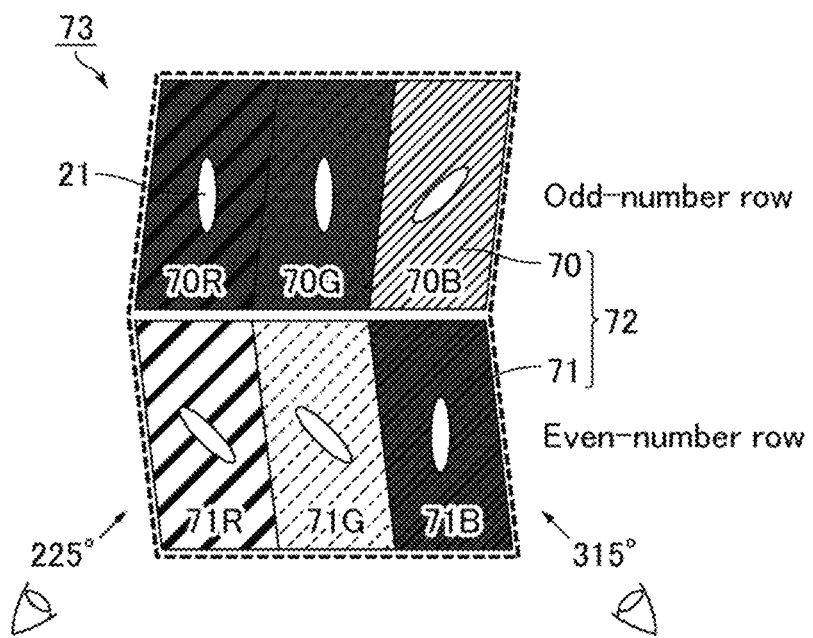
FIG. 18 is a schematic plan view of another exemplary display pattern for a color element.

FIG. 17 is a schematic plan view of an exemplary display pattern for a color element. FIG. 18 is a schematic plan view of another exemplary display pattern for a color element. A row in which the first sub-pixels 70 are arranged is also referred to as an odd-number row. A row in which the second sub-pixels 71 are arranged is also referred to as an even-number row. As shown in FIG. 17, when the first red sub-pixel 70R, the second green sub-pixel 71G, and the second blue sub-pixel 71B are in black display and the second red sub-pixel 71R, the first green sub-pixel 70G, and the first blue sub-pixel 70B are in white display, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived. Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 18, when the first red sub-pixel 70R, the first green sub-pixel 70G, and the second blue sub-pixel 71B are in black display and the second red sub-pixel 71R, the second green sub-pixel 71G, and the first blue sub-pixel 70B are in white display, observation at an azimuth of 225° results in perception of a yellow color, which is a mixture of red and green colors, and observation at an azimuth of 315° results in perception of a blue color.

Figure 19:
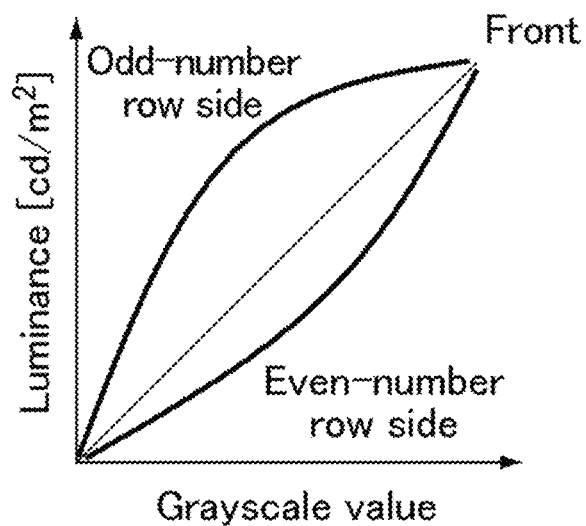
FIG. 19 shows an example of y curves of a liquid crystal panel.

When the display pattern of the color elements shown in FIG. 17 and the display pattern of the color elements shown in FIG. 18 are combined, observation from the direction normal to the liquid crystal panel (from the front) results in observation of white display. FIG. 19 shows an example of y curves of a liquid crystal panel. As shown in FIG. 19, in the range of intermediate values, the difference in contrast ratio between an image formed by sub-pixels on the odd-number row side and an image formed by sub-pixels on the even-number row side is large. A veil-view pattern is preferably formed in such an intermediate value range in which a sufficient difference in perception between the odd-number row side and even-number row side can be achieved.

The second image is preferably a veil-view pattern. The veil-view pattern is a display image that is to be superimposed with the first image to make the first image less perceivable. Displaying the veil-view pattern further enhances the privacy. The veil-view pattern is not limited, and may be a geometric pattern such as a striped pattern or a checkered pattern, characters, or an image.

Figure 20:
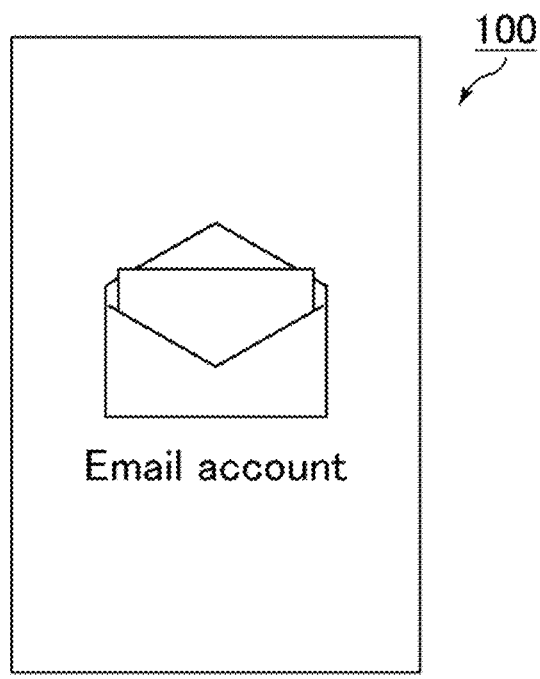
FIG. 20 is a schematic view of a display screen of a liquid crystal panel observed from the normal direction.
Figure 21:
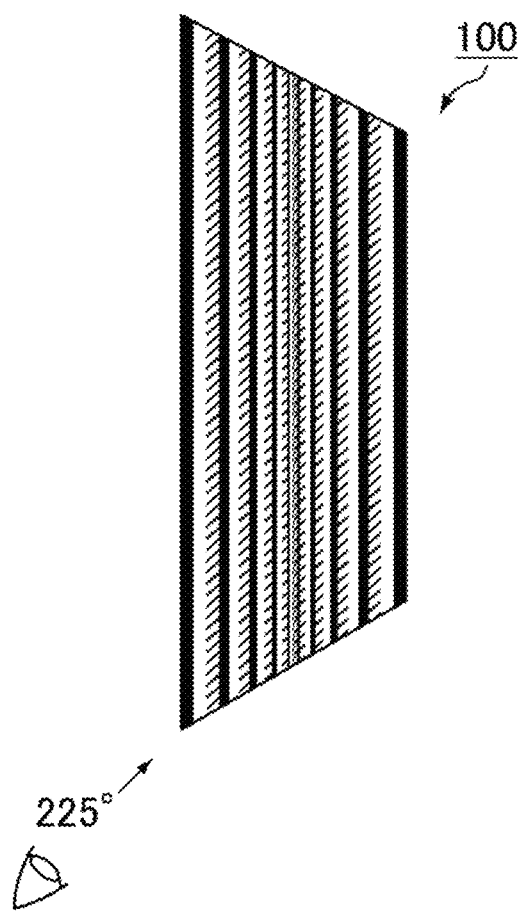
FIG. 21 is a schematic view of the display screen of the liquid crystal panel observed at an azimuth of 225°.
Figure 22:
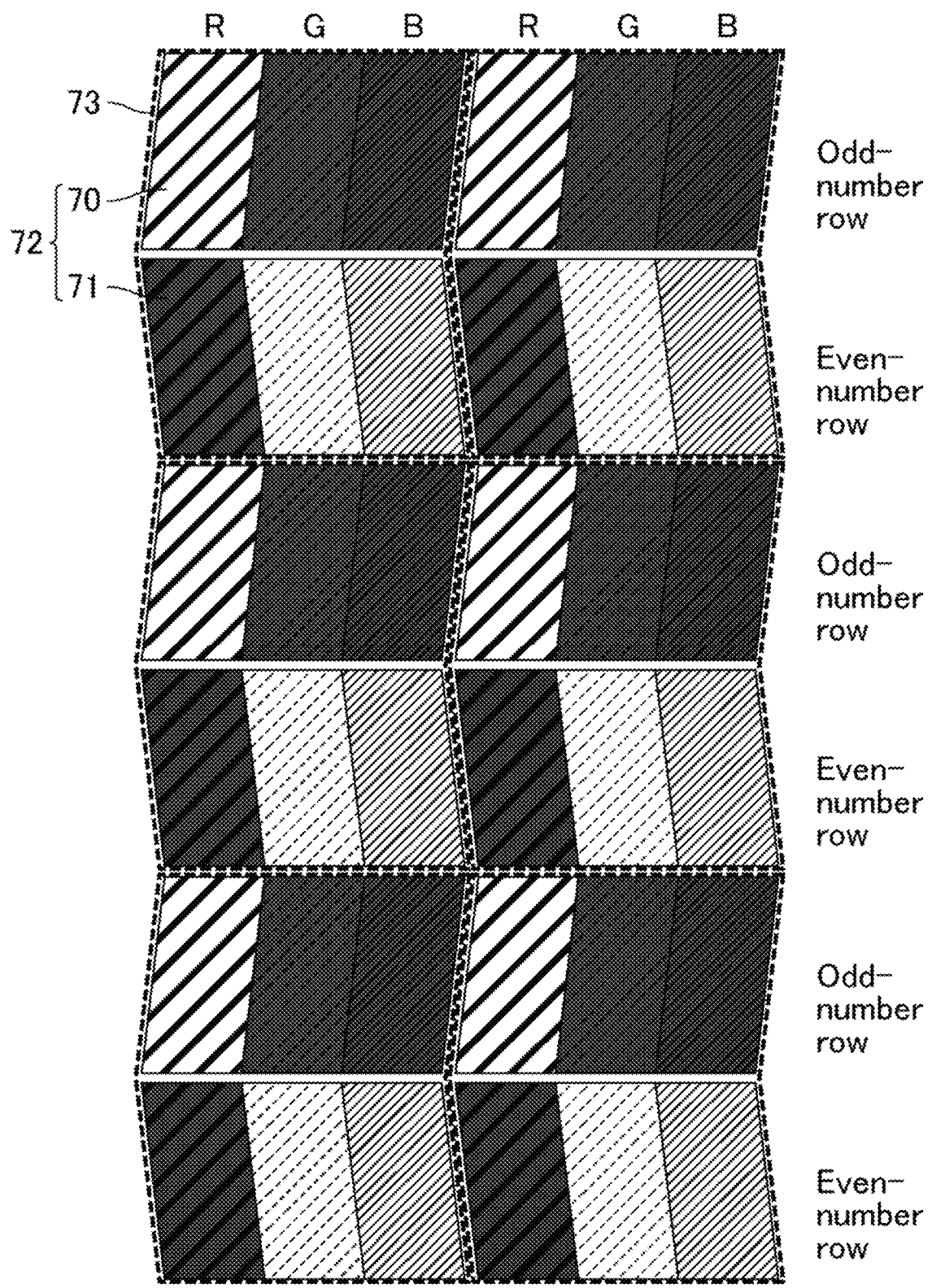
FIG. 22 is a schematic plan view of the liquid crystal panel, showing arrangement of color elements in a portion for displaying cyan stripes shown in FIG. 21.
Figure 23:
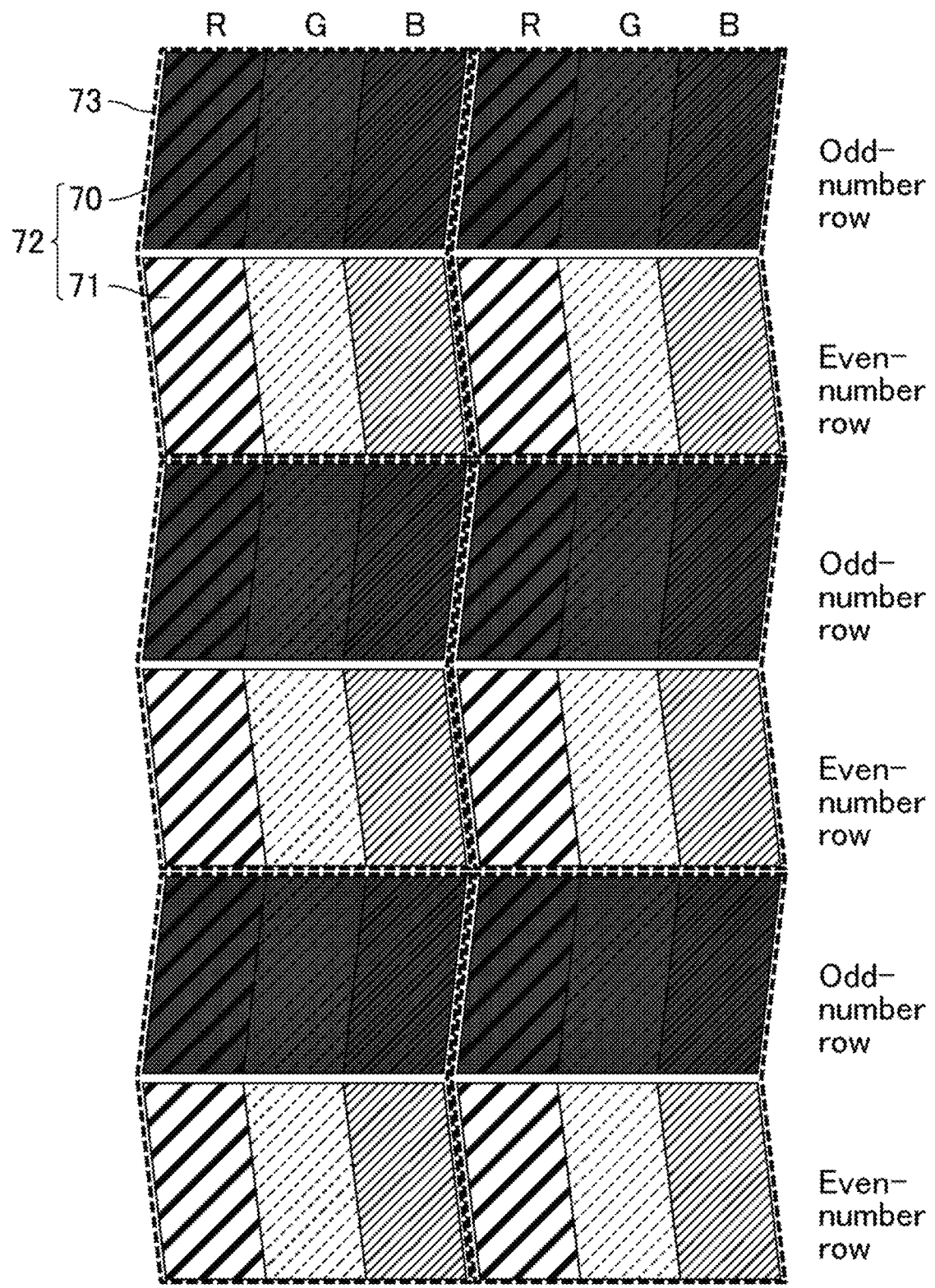
FIG. 23 is a schematic plan view of the liquid crystal panel, showing arrangement of color elements in a portion for displaying white stripes shown in FIG. 21.
Figure 24:
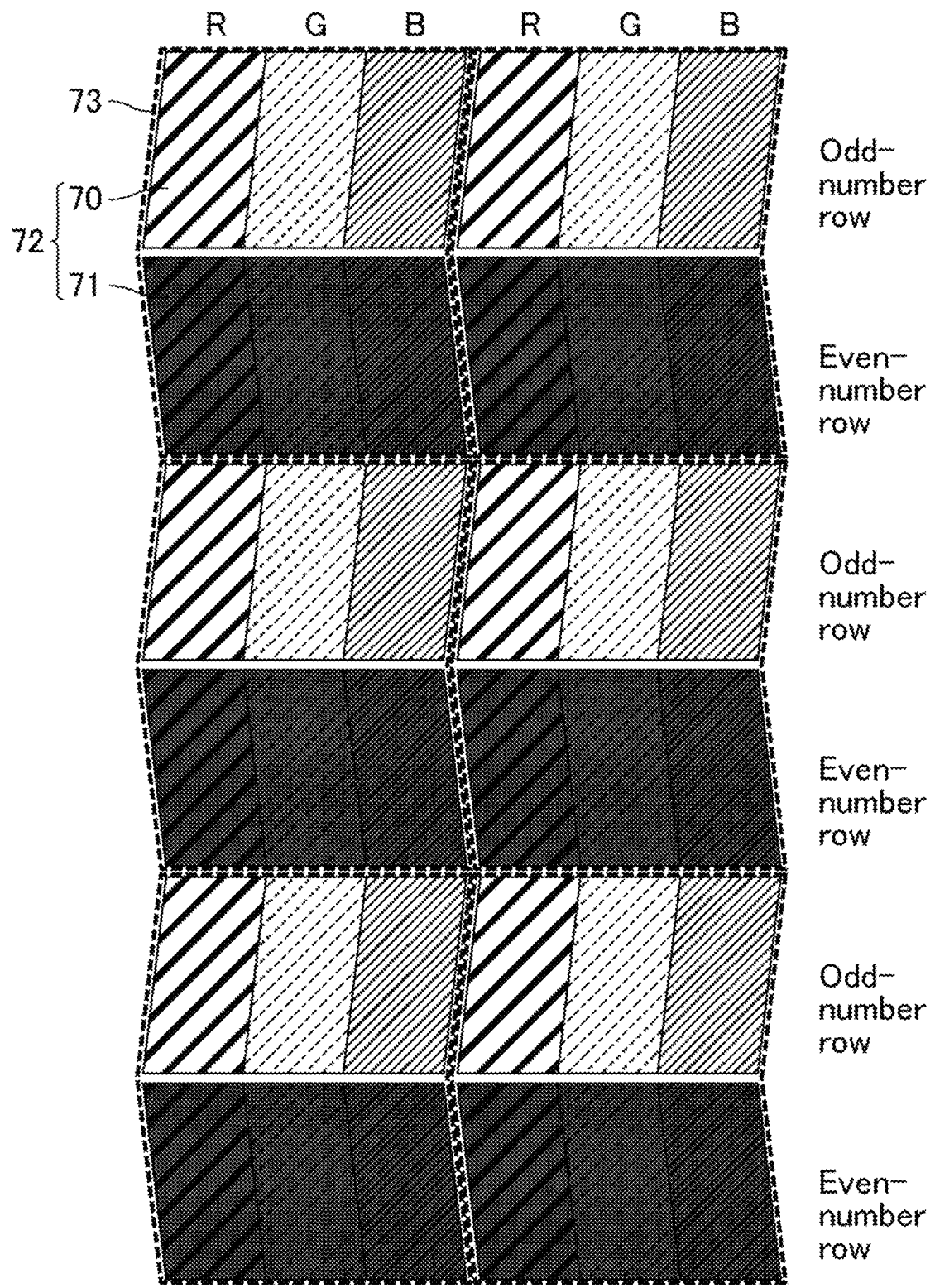
FIG. 24 is a schematic plan view of the liquid crystal panel showing arrangement of color elements in a portion for displaying black stripes shown in FIG. 21.

A specific example of the veil-view pattern is described below with reference to FIG. 20 to FIG. 24. FIG. 22 to FIG. 24 schematically show the first sub-pixel 70 and the second sub-pixel 71 shown in the drawings including FIG. 1. FIG. 20 is a schematic view of a display screen of a liquid crystal panel observed from the normal direction. FIG. 21 is a schematic view of the display screen of the liquid crystal panel observed at an azimuth of 225°. When the display screen of the liquid crystal panel is observed from the normal direction, an envelope image and the characters "Email account" are perceived as the first image as shown in FIG. 20. When the display screen of the liquid crystal panel is observed at an azimuth of 225°, a striped pattern as shown in FIG. 21 is perceived as the veil-view pattern on the first image. This makes the first image less perceivable from oblique directions, enhancing the privacy.

As shown in FIG. 21, the striped pattern is perceived as, for example, stripes of cyan, white, and black in observation at an azimuth of 225° and stripes of red, black, and white in observation at an azimuth of 315°.

FIG. 22 is a schematic plan view of a liquid crystal panel showing arrangement of color elements in a portion for displaying cyan stripes shown in FIG. 21. As shown in FIG. 22, color elements 73 are arranged in the row and column directions of the liquid crystal panel, with the first red sub-pixels 70R, the second green sub-pixels 71G, and the second blue sub-pixels 71B providing normal display and the second red sub-pixels 71R, the first green sub-pixels 70G, and the first blue sub-pixels 70B providing black display. With this arrangement, the liquid crystal display device can display cyan stripes as the second image in observation at an azimuth of 225° and red stripes as the second image in observation at an azimuth of 315°. The normal display is display for the first image.

FIG. 23 is a schematic plan view of a liquid crystal panel showing arrangement of color elements in a portion for displaying white stripes shown in FIG. 21. For white stripes, as shown in FIG. 23, the color elements 73 are arranged in the row and column directions of the liquid crystal panel, with the first red sub-pixels 70R, the first green sub-pixels 70G, and the first blue sub-pixels 70B providing black display and the second red sub-pixels 71R, the second green sub-pixels 71G, and the second blue sub-pixels 71B providing normal display. With this arrangement, the liquid crystal display device can display white stripes in observation at an azimuth of 225° and black stripes in observation at an azimuth of 315°.

FIG. 24 is a schematic plan view of the liquid crystal panel showing arrangement of color elements in a portion for displaying black stripes shown in FIG. 21. For black stripes, as shown in FIG. 24, the color elements 73 are arranged in the row and column directions of the liquid crystal panel, with the first red sub-pixels 70R, the first green sub-pixels 70G, and the first blue sub-pixels 70B providing normal display and the second red sub-pixels 71R, the second green sub-pixels 71G, and the second blue sub-pixels 71B providing black display. With this arrangement, the liquid crystal display device can display black stripes in observation at an azimuth of 225° and white stripes in observation at an azimuth of 315°.

Hereinafter, the effects of the present invention are described based on examples. The examples, however, are not intended to limit the scope of the present invention.

Example 1

A liquid crystal display device according to Example 1 includes the liquid crystal panel 100 and the control circuit 200. The liquid crystal panel 100 has the structure shown in FIG. 1 to FIG. 3 and FIGS. 5A to 5C. The control circuit 200 can operate the control shown in FIG. 13 and FIG. 16. The liquid crystal panel 100 sequentially includes the first polarizer 61, the active matrix substrate 10, the first alignment film 41, the liquid crystal layer 20, the second alignment film 42, the counter substrate 30, and the second polarizer 62. The absorption axis 61A of the first polarizer 61 and the absorption axis 62A of the second polarizer 62 were made perpendicular to each other, and the absorption axis 62A was made parallel to the longitudinal direction of the sub-pixels.

The active matrix substrate 10 sequentially includes the first substrate 11, a 100-nm-thick ITO solid electrode as the first electrode 12, a 110-μm-thick silicon nitride film as the first insulating layer 13, and an ITO electrode disposed for each sub-pixel as the second electrode 14. Each second electrode 14 included the linear electrode portions 14a, and the ratio of width $L_{14}$ of one linear electrode portion 14a/distance $S_{14}$ between two adjacent linear electrode portions 14a was 2.5 μm/3 μm. The angle θ1 formed by the extending direction D1 (first direction) of the linear electrode portions 14a and the absorption axis 62A was 5°.

The liquid crystal layer 20 contains the liquid crystal molecules 21 having a positive anisotropy of dielectric constant (Δε=7). The first alignment film 41 and the second alignment film 42 used were each a horizontal alignment film subjected to an alignment treatment for aligning the liquid crystal molecules at a pre-tilt angle of 0° with respect to the surface of the active matrix substrate 10 and the surface of the counter substrate 30.

The counter substrate 30 sequentially includes the second substrate 31, the color filters 32 and the black matrix 33, a 1.5-μm-thick resin layer as the first dielectric layer 37, a 100-nm-thick ITO electrode as the third electrode 34, a 300-nm-thick silicon nitride film as the second insulating layer 35, a 100-nm-thick ITO electrode as the fourth electrode 36, and a 2-μm-thick resin layer as the second dielectric layer 38.

The third electrode 34 includes the linear electrode portions 34a extending in the second direction D2, and the fourth electrode 36 includes the linear electrode portions 36a extending in the third direction D3. The width $L_{34}$ of one linear electrode portion 34a and the width $L_{36}$ of one linear electrode portion 36a were each 3 μm. The second direction D2 was made parallel to the absorption axis 62A of the second polarizer 62, and the third direction D3 was made parallel to the absorption axis 61A of the first polarizer 61. In other words, the angle θ2 formed by the second direction D2 and the third direction D3 was made 90°. In a plan view of one sub-pixel, the third electrode 34 includes two linear electrode portions 34a forming an angle of 5° with respect to the extending direction D1 of the linear electrode portions 14a of the second electrodes 14, and the fourth electrode 36 includes six linear electrode portions 36a forming an angle of 85° with respect to the direction D1, as shown in FIG. 2. The two linear electrode portions 34a were made superimposed with the black matrix 33 in a plan view.

The first electrode 12 is disposed for each sub-pixel, is electrically connected to the corresponding TFT, and receives a different voltage for each sub-pixel from the control circuit 200. The second electrodes 14 disposed for the respective sub-pixels are electrically connected to each other. The second electrodes 14 are grounded, and the voltage (0 V) applied to the second electrodes 14 is considered as the constant voltage (common voltage). The control circuit 200 switched between application of an alternating voltage and application of a constant voltage to the third electrode 34 and/or the fourth electrode 36, whereby display modes were switched.

Example 2

A liquid crystal display device according to Example 2 has the same configuration as that of Example 1 except for the configuration of the third electrode 34. In Example 2, the third electrode 34 includes one linear electrode portion 34a forming an angle of 5° with respect to the first direction D1 in a plan view of one sub-pixel as shown in FIG. 4. The linear electrode portion 34a was disposed in the center of the sub-pixel along the absorption axis 62A of the second polarizer 62.

Figure 25:
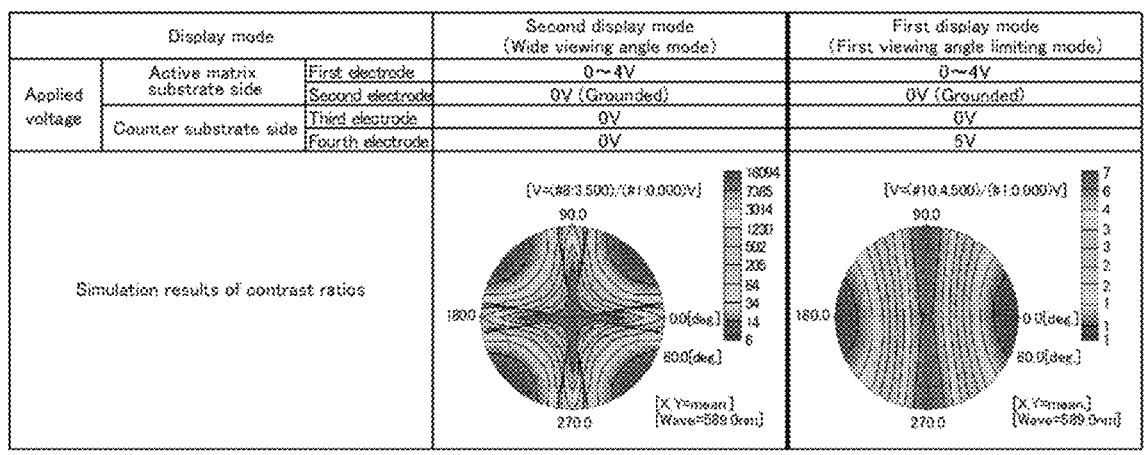
FIG. 25 shows a table summarizing the simulation results of the wide viewing angle mode and the first viewing angle limiting mode in Example 1.
Figure 26:
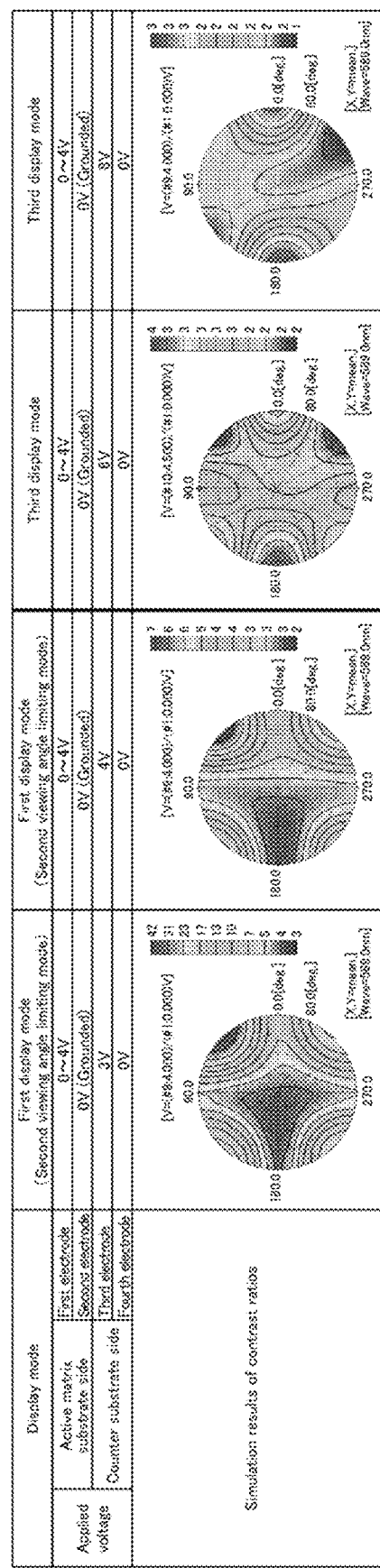
FIG. 26 shows a table summarizing the simulation results of the second viewing angle limiting mode and the third display mode in Example 1.
Figure 27:
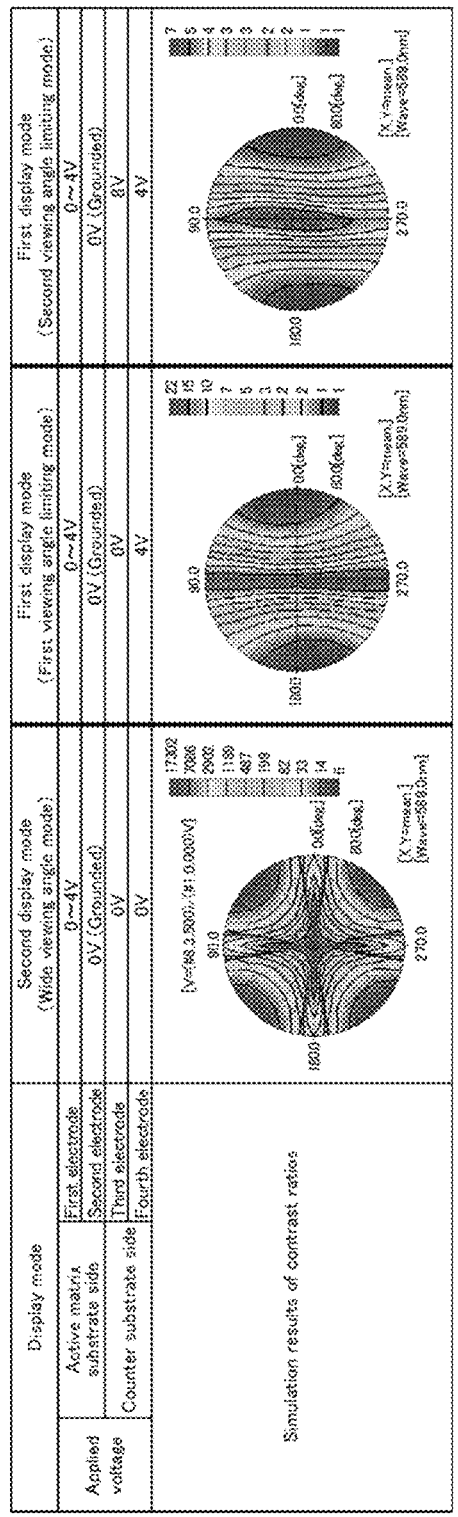
FIG. 27 shows a table summarizing the simulation results of the wide viewing angle mode, the first viewing angle limiting mode, and the second viewing angle limiting mode in Example 2.

Concerning the liquid crystal display devices according to Examples 1 and 2, the viewing angle range was determined in the first display mode (first viewing angle limiting mode and second viewing angle limiting mode), the second display mode, and the third display mode, using an LCD master 3D (available from Shintec Co., Ltd.). FIG. 25 shows a table summarizing the simulation results of the wide viewing angle mode and the first viewing angle limiting mode in Example 1. FIG. 26 shows a table summarizing the simulation results of the second viewing angle limiting mode and the third display mode in Example 1. FIG. 27 shows a table summarizing the simulation results of the wide viewing angle mode, the first viewing angle limiting mode, and the second viewing angle limiting mode in Example 2. Display was provided in the respective modes by applying a common voltage to the second electrodes and applying an alternating voltage of 4 V relative to the common voltage to the first electrode while applying the voltages shown in FIG. 25 to FIG. 27 to the third electrode and the fourth electrode. Then, the contrast ratios of the display panel observed in an azimuth range from 0° to 360° were simulated. In FIG. 25 to FIG. 27, a grounded electrode was marked as "Grounded". The resulting simulation figures indicate that an azimuth having a high contrast ratio provides good perception. The contrast ratio is expressed by the following formula.

Contrast ratio=maximum luminance with voltage applied/luminance with no voltage applied According to the simulation results of the contrast ratios of Example 1 shown in FIG. 25, in the second display mode (wide viewing angle mode), the contrast ratio is high at 90°-270° azimuths and 0°-180° azimuths, and thus the perception is good in observation of the liquid crystal panel from the up-down directions and the left-right directions. In contrast, in the first viewing angle limiting mode, the contrast ratio is high at 90°-270° azimuths but is low at 0°-180° azimuths, and thus the display image is less perceivable from the left-right directions of the liquid crystal panel. As shown in FIG. 26, in the second viewing angle limiting mode, the contrast ratio is high at 0°-180° azimuths but is low at 90°-270° azimuths, and thus the display image is less perceivable from the up-down directions of the liquid crystal panel. In the third display mode, the contrast ratio is slightly high at 0°-180° azimuths but is low in observation of the liquid crystal panel from the normal direction, and thus the display image is less perceivable from the normal direction.

According to the simulation results of the contrast ratios of Example 2 shown in FIG. 27, even when the third electrode includes one linear electrode portion for one sub-pixel, the perception of the liquid crystal panel from the up-down directions and the left-right directions is good in the wide viewing angle mode where no voltage is applied to the third electrode and the fourth electrode. In contrast, the first viewing angle limiting mode, in which a voltage higher than the voltage applied to the third electrode is applied to the fourth electrode, enhances the privacy in observation of the liquid crystal panel from the left-right directions, and the second viewing angle limiting mode, in which a voltage higher than the voltage applied to the fourth electrode is applied to the third electrode, can enhance the privacy in observation of the liquid crystal panel from the up-down directions.

REFERENCE SIGNS LIST

1: gate line
2: source line
3: TFT
10: active matrix substrate
11: first substrate
12: first electrode
13: first insulating layer
14: second electrode
14a, 34a, 36a: linear electrode portion
14b: opening
20: liquid crystal layer
21: liquid crystal molecule
30: counter substrate
31: second substrate
32: color filter
32B: blue color filter
32G: green color filter
32R: red color filter
33: black matrix
34: third electrode
35: second insulating layer
36: fourth electrode
37: first dielectric layer
38: second dielectric layer
41: first alignment film
42: second alignment film
61: first polarizer
61A: absorption axis of first polarizer
62: second polarizer
62A: absorption axis of second polarizer
70: sub-pixel (first sub-pixel)
70B: first blue sub-pixel
70G: first green sub-pixel
70R: first red sub-pixel
71: second sub-pixel
71B: second blue sub-pixel
71G: second green sub-pixel
71R: second red sub-pixel
72: display unit
72B: blue display unit
72G: green display unit
72R: red display unit
73: color element
100: liquid crystal panel
101: first electrode drive circuit
102: second electrode drive circuit
103: third electrode drive circuit
104: fourth electrode drive circuit
200: control circuit
201: image signal synthesis circuit
202: display mode selection circuit
203: application voltage switching circuit
204: database
211: raw image signal
212: image signal
213: display mode switching signal
214: first viewing angle limiting mode selection signal
215: second viewing angle limiting mode selection signal
216: second display mode selection signal
217: third display mode selection signal
218: alternating signal
219: constant voltage signal
220: veil-view display switching signal
221: veil-view pattern image signal

What is claimed is:

1. A liquid crystal display device comprising:
a liquid crystal panel; and
a control circuit,
the liquid crystal panel comprising sub-pixels arranged in a matrix pattern in an in-plane direction and sequentially comprising an active matrix substrate, a first alignment film, a liquid crystal layer containing liquid crystal molecules, a second alignment film, and a counter substrate,
the active matrix substrate including a first substrate, and a first electrode and a second electrode that are stacked via a first insulating layer or that face each other on the first substrate,
the second electrode being disposed for each of the sub-pixels,
the counter substrate sequentially including a second substrate, a third electrode including linear electrode portions, a second insulating layer, and a fourth electrode including linear electrode portions,
an extending direction of the linear electrode portions of the third electrode intersecting an extending direction of the linear electrode portions of the fourth electrode in a plan view,
the control circuit being configured to switch between application of an alternating voltage and application of a constant voltage to the third electrode and/or the fourth electrode,
the control circuit is configured to switch between a first display mode that allows a first image to be observable in a narrow viewing angle range including a normal direction of the liquid crystal panel and a second display mode that allows the first image to be observable in a wide viewing angle range including the narrow viewing angle range,
in the first display mode, the control circuit applies to one of the third electrode and the fourth electrode a constant voltage common to the first electrode or the second electrode or an alternating voltage higher than the constant voltage and applies to the other of the third electrode and the fourth electrode an alternating voltage higher than the voltage applied to the one of the third electrode and the fourth electrode, and in the second display mode, the control circuit applies to the third electrode and the fourth electrode a constant voltage common to the first electrode or the second electrode.

2. The liquid crystal display device according to claim 1, wherein at least one of the first electrode or the second electrode includes linear electrode portions extending in a first direction, the extending direction of the linear electrode portions of the third electrode forms an angle of 0° or greater and 30° or smaller with the first direction, the extending direction of the linear electrode portions of the fourth electrode forms an angle of 60° or greater and 90° or smaller with the first direction, and in the first display mode, the control circuit switches between a first viewing angle limiting mode in which an alternating voltage higher than the voltage applied to the third electrode is applied to the fourth electrode and a second viewing angle limiting mode in which an alternating voltage higher than the voltage applied to the fourth electrode is applied to the third electrode.

3. The liquid crystal display device according to claim 1, wherein the liquid crystal panel includes display units that utilize a veil-view function to display an image, the display units each include a pair of sub-pixels arranged adjacent to each other, one of the sub-pixels being a first sub-pixel selected from odd-number rows and the other being a second sub-pixel selected from even-number rows, and the control circuit is configured to input different image signals to the respective sub-pixels so as to allow a second image, different from the first image, to be observable in the wide viewing angle range.

4. The liquid crystal display device according to claim 1, wherein the counter substrate includes a dielectric layer between the fourth electrode and the second alignment film.

\* \* \* \* \*